(12) United States Patent  
Meins et al.

(10) Patent No.: US 8,360,216 B2
(45) Date of Patent: *Jan. 29, 2013

(54) SYSTEM AND METHOD FOR TRANSFERRING ELECTRIC ENERGY TO A VEHICLE

(75) Inventors: Jürgen Meins, Braunschweig (DE); Kurt Vollenwyder, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 15 days.

This patent is subject to a terminal disclaimer.

(21) Appl. No.: 13/002,066

(22) PCT Filed: Jul. 2, 2009

(86) PCT No.: PCT/EP2009/004961
§ 371 (c)(1),
(2), (4) Date: Mar. 21, 2011

(87) PCT Pub. No.: WO2010/000495
PCT Pub. Date: Jan. 7, 2010

(65) Prior Publication Data
US 2011/0266109 A1 Nov. 3, 2011

(30) Foreign Application Priority Data
Jul. 4, 2008 (GB) .................................. 0812344.0

(51) Int. Cl.
*B60L 9/00* (2006.01)
(52) U.S. Cl. ........................................ 191/10; 191/29 R
(58) Field of Classification Search .................... 191/10, 191/22 R, 29 R, 30, 31, 29 DM, 11, 14, 17, 191/18
See application file for complete search history.

(56) References Cited

U.S. PATENT DOCUMENTS

| 2,518,736 A | 8/1950 | Wheeler |
| 3,225,351 A | 12/1965 | Chatelain et al. |
| 3,513,338 A | 5/1970 | Poloujadoff |
| 3,863,574 A | 2/1975 | Thomas |

(Continued)

FOREIGN PATENT DOCUMENTS

| DE | 1806977 | 6/1969 |
| DE | 2310812 | 9/1973 |

(Continued)

OTHER PUBLICATIONS

Chen et al., "Inductive Power Transferring in Maglev Using Harmonic Injection Method", IEEE, 2004, pp. 1165-1170.

(Continued)

*Primary Examiner* — Jason C Smith
(74) *Attorney, Agent, or Firm* — The Webb Law Firm

(57) ABSTRACT

The invention relates to a system for transferring electric energy to a vehicle, in particular to a track bound vehicle such as a light rail vehicle, wherein the system comprises an electric conductor arrangement for producing an alternating electromagnetic field and for thereby transferring the energy to the vehicle, the electric conductor arrangement comprises at least two lines, wherein each line is adapted to carry a different one of phases of an alternating electric current, the conductor arrangement comprises a plurality of segments, wherein each segment extends along a different section of the path of travel of the vehicle, each segment comprises sections of the at least two lines and each segment can be switched on and off separately of the other segments.

8 Claims, 14 Drawing Sheets

U.S. PATENT DOCUMENTS

Figure 1:
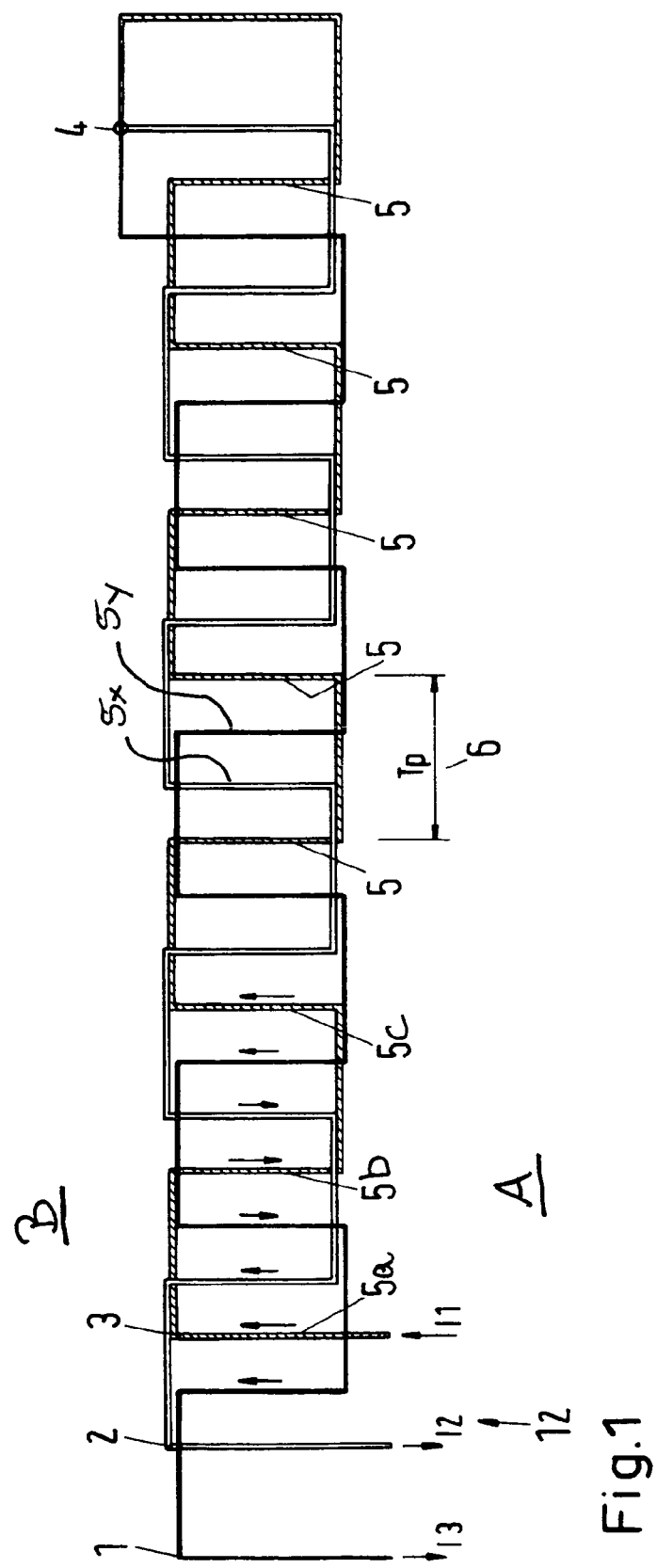

| | | | |
|---|---|---|---|
| 3,914,562 A | 10/1975 | Bolger | |
| 4,068,152 A | 1/1978 | Nakamura et al. | |
| 4,328,499 A | 5/1982 | Anderson et al. | |
| 4,331,225 A * | 5/1982 | Bolger | 191/10 |
| 4,836,344 A * | 6/1989 | Bolger | 191/10 |
| 4,916,599 A * | 4/1990 | Traxler et al. | 363/65 |
| 5,311,973 A | 5/1994 | Tseng et al. | |
| 5,573,090 A | 11/1996 | Ross | |
| 5,669,470 A | 9/1997 | Ross | |
| 5,708,427 A | 1/1998 | Bush | |
| 5,821,728 A | 10/1998 | Schwind | |
| 5,831,841 A * | 11/1998 | Nishino | 363/37 |
| 5,898,579 A | 4/1999 | Boys et al. | |
| 6,005,304 A | 12/1999 | Seelig | |
| 6,089,362 A | 7/2000 | Takasan et al. | |
| 6,089,512 A | 7/2000 | Ansorge et al. | |
| 6,230,861 B1 | 5/2001 | Cornic | |
| 6,250,442 B1 | 6/2001 | Perraud et al. | |
| 6,286,434 B1 | 9/2001 | Fischperer | |
| 6,382,378 B1 | 5/2002 | Cornic | |
| 6,407,470 B1 | 6/2002 | Seelig | |
| 6,421,600 B1 | 7/2002 | Ross | |
| 6,462,432 B1 * | 10/2002 | Seelig et al. | 307/33 |
| 6,499,701 B1 | 12/2002 | Thornton et al. | |
| 6,502,517 B1 | 1/2003 | Groening et al. | |
| 6,753,666 B2 | 6/2004 | Fischperer | |
| 6,868,073 B1 | 3/2005 | Carrender | |
| 6,879,889 B2 | 4/2005 | Ross | |
| 6,985,107 B2 | 1/2006 | Anson et al. | |
| 7,038,573 B2 | 5/2006 | Bann | |
| 7,084,527 B2 | 8/2006 | Futschek | |
| 7,116,540 B2 | 10/2006 | Green et al. | |
| 7,243,752 B2 | 7/2007 | Green et al. | |
| 7,276,812 B2 * | 10/2007 | Uhl | 307/61 |
| 7,277,675 B2 | 10/2007 | Lohr et al. | |
| 7,298,314 B2 | 11/2007 | Schantz et al. | |
| 7,365,698 B2 | 4/2008 | Dwyer et al. | |
| 7,385,363 B2 | 6/2008 | Schemm | |
| 7,511,250 B2 | 3/2009 | Lindig | |
| 7,518,520 B2 | 4/2009 | Mullins | |
| 7,560,927 B2 | 7/2009 | Maguire et al. | |
| 7,694,632 B2 | 4/2010 | Ellmann et al. | |
| 7,733,676 B2 * | 6/2010 | Nunoya et al. | 363/72 |
| 2003/0105560 A1 | 6/2003 | Sugita et al. | |
| 2003/0200025 A1 | 10/2003 | Ross | |
| 2005/0161300 A1 * | 7/2005 | Green | 190/10 |
| 2005/0178632 A1 * | 8/2005 | Ross | 191/10 |
| 2006/0197939 A1 | 9/2006 | Baiker et al. | |
| 2007/0289476 A1 * | 12/2007 | Schemm et al. | 104/290 |
| 2008/0129246 A1 * | 6/2008 | Morita et al. | 320/108 |
| 2008/0316085 A1 | 12/2008 | Rofougaran et al. | |
| 2008/0316103 A1 | 12/2008 | Rofougaran et al. | |
| 2009/0013899 A1 * | 1/2009 | Wolf et al. | 104/288 |
| 2011/0198176 A1 * | 8/2011 | Meins et al. | 191/10 |
| 2011/0253495 A1 * | 10/2011 | Vollenwyder et al. | 191/10 |
| 2011/0266109 A1 * | 11/2011 | Meins et al. | 191/29 R |
| 2012/0055751 A1 * | 3/2012 | Vollenwyder et al. | 191/10 |
| 2012/0085610 A1 * | 4/2012 | Alexandre | 191/10 |

FOREIGN PATENT DOCUMENTS

| | | |
|---|---|---|
| DE | 3527309 A1 | 2/1987 |
| DE | 3714263 A1 | 10/1988 |
| DE | 4115568 A1 | 2/1993 |
| DE | 4236340 A1 | 5/1994 |
| DE | 4236340 C2 | 5/1994 |
| DE | 4342319 A1 | 6/1995 |
| DE | 4429656 C1 | 4/1996 |
| DE | 4446779 A1 | 6/1996 |
| DE | 19512107 B4 | 10/1996 |
| DE | 19512523 A1 | 10/1996 |
| DE | 19735624 C1 | 12/1998 |
| DE | 19723959 A1 | 1/1999 |
| DE | 19746919 A1 | 5/1999 |
| DE | 19801586 A1 | 7/1999 |
| DE | 19856937 A1 | 6/2000 |
| DE | 20002984 U1 | 8/2000 |
| DE | 19947368 C1 | 5/2001 |
| DE | 10013767 A1 | 10/2001 |
| DE | 10026175 A1 | 7/2002 |
| DE | 10112892 A1 | 10/2002 |
| DE | 10227253 A1 | 10/2003 |
| DE | 20209092 U1 | 11/2003 |
| DE | 10225005 C1 | 12/2003 |
| DE | 10326614 A1 | 12/2004 |
| DE | 10334736 A1 | 2/2005 |
| DE | 10334737 A1 | 2/2005 |
| DE | 10346105 A1 | 4/2005 |
| DE | 10349242 B3 | 4/2005 |
| DE | 102004009896 A1 | 9/2005 |
| DE | 102004012746 A1 | 10/2005 |
| DE | 10216422 B4 | 7/2006 |
| DE | 69929353 T2 | 9/2006 |
| DE | 102006006384 A1 | 9/2006 |
| DE | 102004031580 B4 | 2/2007 |
| DE | 102006049588 A1 | 8/2007 |
| EP | 0187526 A2 | 7/1986 |
| EP | 0187527 A2 | 7/1986 |
| EP | 0289868 A2 | 11/1988 |
| EP | 0608242 B1 | 8/1994 |
| EP | 0640255 B1 | 3/1995 |
| EP | 0681939 B1 | 11/1995 |
| EP | 0761493 A1 | 3/1997 |
| EP | 0666804 B1 | 9/1997 |
| EP | 0818868 B1 | 1/1998 |
| EP | 0962353 A1 | 12/1999 |
| EP | 0979176 B1 | 2/2000 |
| EP | 1011187 A1 | 6/2000 |
| EP | 1043186 A1 | 10/2000 |
| EP | 1043187 A1 | 10/2000 |
| EP | 1050094 B1 | 11/2000 |
| EP | 1095812 A1 | 5/2001 |
| EP | 1582395 A1 | 10/2005 |
| EP | 1610450 A2 | 12/2005 |
| EP | 1744443 A1 | 1/2007 |
| GB | 638143 | 5/1950 |
| GB | 657035 | 9/1951 |
| GB | 657036 | 9/1951 |
| GB | 1280148 | 7/1972 |
| GB | 1390225 | 4/1975 |
| GB | 2236957 A | 4/1991 |
| GB | 2399465 A | 9/2004 |
| GB | 2461577 A | 1/2010 |
| GB | 2463692 A | 3/2010 |
| GB | 2463693 A | 3/2010 |
| JP | 5843104 A | 3/1983 |
| JP | 6376505 U | 5/1988 |
| WO | 9101232 A1 | 2/1991 |
| WO | 9217929 A1 | 10/1992 |
| WO | 9323908 A1 | 11/1993 |
| WO | 9323909 A1 | 11/1993 |
| WO | 9425304 A1 | 11/1994 |
| WO | 9511544 A1 | 4/1995 |
| WO | 9511545 A1 | 4/1995 |
| WO | 9530556 A2 | 11/1995 |
| WO | 9823017 A1 | 5/1998 |
| WO | 9908359 A1 | 2/1999 |
| WO | 0118936 A1 | 3/2001 |
| WO | 0171882 A1 | 9/2001 |
| WO | 0235676 A1 | 5/2002 |
| WO | 03052900 A2 | 6/2003 |
| WO | 03095282 A2 | 11/2003 |
| WO | 2004030975 A2 | 4/2004 |
| WO | 2004105226 A1 | 12/2004 |
| WO | 2007126321 A1 | 11/2007 |
| WO | 2009007666 A1 | 1/2009 |
| WO | 2009127938 A2 | 10/2009 |
| WO | 2010031596 A2 | 3/2010 |
| WO | 2010033584 A2 | 3/2010 |

OTHER PUBLICATIONS

Kazimierczuk et al., "Class-E Amplifier with an Inductive Impedance Inverter", IEEE Transactions on Industrial Electronics, Apr. 1990, pp. 160-166, vol. 37, No. 2.

Green et al., "10 kHz Inductively Coupled Power Transfer—Concept and Control", IEEE Power Electronics and Variable-Speed Drives, Oct. 1994, pp. 694-699, Conference Publication No. 399.

"Microgrid Powered Electric Vehicles: Wireless Energy Transfer Technology", Energy Transport Technologies, "http://ettek.com/images/TechWeb.pdf", published online by at least Dec. 17, 2007, pp. 1-14.

Sato et al., "A New Meander Type Contactless Power Transmission System—Active Excitation with a Characteristics of Coil Shape", IEEE Transactions on Magnetics, Jul. 1998, pp. 2069-2071, vol. 34, No. 4.

Meins et al., "Contactless High Power Supply", Sixth International Conference on Unconventional Electromechanical and Electrical Systems, Sep. 24-29, 2004, vol. 2, 7 pages.

Covic et al., "A Three-Phase Inductive Power Transfer System for Roadway-Powered Vehicles", IEEE Transactions on Industrial Electronics, Dec. 2007, pp. 3370-3378, vol. 54, No. 6.

* cited by examiner

SYSTEM AND METHOD FOR TRANSFERRING ELECTRIC ENERGY TO A VEHICLE

BACKGROUND OF THE INVENTION

1. Field of the Invention

The invention relates to a system and a method for transferring electric energy to a vehicle, in particular to a track bound vehicle such as a light rail vehicle (e.g. a tram).

2. Description of the Prior Art

In particular track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to transferring electric energy to a vehicle which is not necessarily (but preferably) a track bound vehicle. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

Track bound vehicles, in particular vehicles for public passenger transport, usually comprise a current collector (alternatively a device) for mechanically and electrically contacting a line conductor along the track, such as an electric rail or an overhead line. At least one propulsion motor on board the vehicles is fed with the electrical power from the external track or line and produces mechanical propulsion force.

Trams and other local or regional trains are operated usually via overhead lines within cities. However, especially in historic parts of cities, overhead lines are undesirable. On the other hand, conductor rails in the ground or near the ground cause safety problems.

WO 95/30556 A2 describes a road way-powered electric vehicle system. The all-electric vehicle has one or more on-board energy storage elements or devices that can be rapidly charged or energized with energy obtained from an electrical source, such as a network of electromechanical batteries. The energy storage elements may be charged while the vehicle is in operation. The charging occurs through a network of power coupling elements, e.g. coils embedded in the road way.

Placing the coils at selected locations along the length of the roadway has the disadvantage that the energy storage on board the vehicle needs a large storage capacity. In addition, if the vehicle does not reach the next coil in time, the vehicle might run out of energy for propulsion or other purposes. Therefore, at least for some applications, it is preferred to transfer energy to the vehicle continuously along the path of travel, i.e. along the track.

Inductively transferring energy from the track to the vehicle, i.e. producing electromagnetic fields, is subject to restrictions regarding EMC (electromagnetic compatibility). On one hand, electromagnetic fields may interfere with other technical devices. On the other hand, people and animals should not be subjected to electromagnetic fields permanently. At least, the respective limit values for field intensity must be observed.

SUMMARY OF THE INVENTION

It is an object of the present invention to provide a system and method for transferring electric energy to a vehicle, in particular to a track bound vehicle, which allows for continuous transfer of electric energy during travel and which facilitates meeting the respective limits for EMC.

According to a basic idea of the present invention energy is transferred from an electric conductor arrangement, which is arranged along the track, to the vehicle travelling on the track without having electric contact between the vehicle and the conductor arrangement. The conductor arrangement carries an alternating current which generates a respective electromagnetic field and the electromagnetic field is used to transfer the electric energy to the vehicle.

Preferably, the conductor arrangement is located in and/or under the track, for example under the surface of the ground on which the vehicle travels. However, the invention also includes the case that at least a part of the conductor arrangement is located sideways of the track, for example when the track is located in the country side or in a tunnel.

The frequency of the alternating current which flows through the conductor arrangement may be in the range of 5-100 kHz, in particular in the range of 10-30 kHz, preferably about 20 kHz.

The principle of transferring the energy by electromagnetic fields has the advantage that the conductor arrangement can be electrically insulated against contact. For example the wires or lines of the conductor arrangement can be buried in the ground. No pedestrian may unintentionally contact the buried lines. Furthermore, the problem of wear and tear of a current collector, which is used to contact standard overhead lines or live rails is solved.

As principally disclosed in WO 95/30556 A2, the vehicle which is travelling on the track may comprise at least one coil and the electromagnetic field generates an electric alternating voltage in the coil which can be used to operate any electric load in the vehicle, such as a propulsion motor, or can be used to charge an energy storage system, such as conventional batteries and/or super caps.

In particular, the following is proposed: A system for transferring electric energy to a track bound vehicle, in particular to a light rail vehicle, such as a tram, wherein the system comprises an electric conductor arrangement for producing an electromagnetic field and for thereby transferring the energy to the vehicle, the electric conductor arrangement comprises at least two lines, wherein each line is adapted to carry a different one of phases of an alternating electric current, the conductor arrangement comprises a plurality of segments, wherein each segment extends along a different section of the path of travel of the vehicle (e.g. the track), each segment comprises sections of the at least two lines and each segment can be switched on and off separately of the other segments.

It is one advantage of such a system that electromagnetic fields for transferring energy to the vehicles can be produced where necessary. As a result, losses during the operation of the system are reduced. Furthermore, EMC requirements can be met more easily, since unnecessary electromagnetic fields are avoided.

A segment is understood to be a part of the conductor arrangement, wherein each segment produces an electromagnetic field for transferring energy to a vehicle, provided that the segment is switched on, i.e. is operated. In particular, each segment may consist of sections of the at least two lines of the conductor arrangement, wherein each line is adapted to carry a different one of the phases of the alternating electric current.

Preferably, the electric conductor arrangement comprises three lines, each line carrying a different phase of a three-phase alternating current. However, it is also possible, that there are only two or more than three-phases carried by a corresponding number of lines. In particular, each of the segments may comprise sections of each of the lines, so that each segment produces an electromagnetic field which is caused by the three phases.

In a preferred embodiment, the at least two lines of the conductor arrangement are connected at a star point, i.e. the lines are connected to each other at a connection point which is common to all phases. Such a star point configuration is particularly easy to realize and ensures that the behaviour of the plural phases is symmetric, i.e. that all phases carry the same effective current, although—of course—there is a phase shift between the phases. For example in the case of a three-phase system, the phase shift is 120°, as usual. The alternating current in each phase may be a sinusoidal or nearly sinusoidal current. An additional advantage of a star point connection is that no backward conductor to the power supply system (which may include a feed line extending along the path of travel, i.e. along the segments) is required. All connections of the conductor arrangement to the power supply system can be made at the same location of the power supply system, in particular at the same location of the feed line.

The star point connection may be realised by a switch or by an arrangement of switches at an interface between consecutive segments of the conductor arrangement. If the consecutive segments are not operated to transferring electric energy to a vehicle at the same time, i.e. if only one of the consecutive segments is operated, the star point connection at the interface is realised. However, if the consecutive segments are operated at the same time, the star point connection at the interface need not be realised, i.e. the switch or arrangement or switches may be open or may be arranged to connect the segment which is operated to the supply system. The same switch or arrangement or switches may serve to connect corresponding lines of consecutive segments, so that these lines are connected in series to each other. Accordingly, in a first switching state, the star point connection is realised and, in a second switching state, the corresponding lines are connected to each other.

If the corresponding lines of consecutive segments (which are operated at the same time) are connected in series to each other, a star point connection at the interface between the consecutive segments is not the only possibility. An alternative may be to connect the lines of the consecutive segments in a delta-connection fashion to the power supply system. However, this may cause a short interruption of the power supply to a particular segment, when a consecutive segment is switched on, since the line ends of the particular segment need to be switched over from the power supply system to the corresponding lines of the consecutive section. In contrast, the solution with star point connections can avoid this interruption, as will be described in the description of the attached figures.

Preferably, segments are operated (i.e. the lines of the segments carry an alternating current which produces an electromagnetic field) only, while corresponding sections of the path of travel are occupied by a vehicle. Consequently, it is preferred that segments at sections of the path, which are not occupied by a vehicle, are switched off.

It is particularly preferred that the sections of the path of travel (along which the segments extend) are shorter than the length of a vehicle on the track in the travel direction and that the system is adapted to operate (and in particular to switch on) segments only if a vehicle is occupying the respective section of the track where the segment is located. Since only segments under (or in some cases like in tunnels sideways of) the track are switched on, the vehicle shields the environment from the electromagnetic field which is produced by the conductor arrangement. Preferably, only segments are operated which are fully occupied by a vehicle, i.e.—in lengthwise direction along the path of travel—the operated segments do not extend beyond the front of the vehicle and do not extend beyond the end of the vehicle.

Most preferred, segments are operated in such a manner that there is continuous transfer of electric energy from the segments to the vehicle while the vehicle is travelling along the path of travel. Therefore, the segments may part of a row of consecutive segments, wherein the row extends along the path of travel. This means that a first segment which is occupied by the vehicle may be operated and before the vehicle (or before the receiving device of the vehicle) enters the next following segment of the row, this next following segment is switched on. On the other hand, the first segment may be switched off after the vehicle has left the corresponding section of the path of travel.

A "corresponding section" is understood to be a section which has—in lengthwise direction along the path of travel—the same extension as the corresponding segment of the conductor arrangement. "Continuous transfer of electric energy" means that the receiving device of the vehicle is always in a section when the corresponding segment is operated (i.e the lines of the segment carry an alternating current for producing an electromagnetic field in order to provide energy to the vehicle). It might happen that there is a short interruption (e.g. of some milli-seconds) of the current flow through the lines when a consecutive segment is switched on or when the first segment is switched off. Despite that, the transfer of electric energy is "continuous", since the receiving device of the vehicle is located in a section when the corresponding segment is operated. However, it is preferred that the transfer of electric energy is also interruption-free. Examples of such an interruption-free transfer will be described below. Interruption-free transfer is particularly easy to achieve if the lines of the consecutive sections are connected in series to each other. Therefore it is preferred that the conductor arrangement is arranged in such a manner that at least two consecutive segments can be operated at the same time, wherein corresponding lines for carrying the same phase of the alternating current in the consecutive sections are connected in series to each other. For example, the interface between the consecutive segments may comprise a switch an arrangement or switches which may connect or disconnect the corresponding lines.

The number of consecutive segments which are operated at the same time is not restricted to two. Rather, three or more consecutive segments can be operated at the same time, for example if a long vehicle is travelling on the path, such as a vehicle having reseeding devices at different locations. In this case, it is preferred that segments are switched off only when the last receiving device has left the section of the path which corresponds to the segment.

The switching process may be controlled using at least one of the lines of the segments which are switched off. Preferably, the occupation of a respective section of the track by a vehicle may be detected, in particular by detecting a voltage and/or a current in the lines of the segment which is caused by inductive coupling of the vehicle to the lines and/or which is caused by electromagnetic fields produced by the vehicle. Correspondingly, a measurement device may be connected to at least one of the lines. Preferably, a plurality of or all of the lines of the segment is connected to a measurement device and/or to the same measurement device. The measurement device or devices is/are adapted to detect the occupation of the respective section of the track by a vehicle by detecting a voltage and/or a current in the line or a separate loop which is caused by inductive coupling of the vehicle to the line and/or which is caused by electromagnetic fields produced by the vehicle.

The system may be adapted to switch on a segment before a receiving device of a vehicle for receiving the transferred energy enters the section of the path of travel where the segment is located.

For example, the length of the segments may be dimensioned in such a manner, that at least two of the segments are covered lengthwise by a vehicle on the track, i.e. the minimum length of a vehicle on the track is twice as long as the length of one segment (preferably, all line segments have the same length). As a result, the receiving device or receiving devices of the vehicle for receiving the transferred energy may be located in the middle section of the vehicle in lengthwise direction. Furthermore, it is preferred that only segments are switched on, which are fully covered by a vehicle on the track. On the other hand, the event that a vehicle is entering the region above a particular line segment can be detected (as mentioned above) and this line segment is switched on, as soon as the vehicle enters the region above the next following line segment.

Accordingly, line segments are switched off before the vehicle leaves the region above the line segment. Preferably they are switched off before they are no longer fully covered by the vehicle.

If the conductor arrangement comprises more than one line, detecting the events that the vehicle enters or leaves a particular line segment, can be performed using one of the lines only. However, the other lines can be switched on and off correspondingly, i.e. the conductor arrangement comprises sections, wherein all lines in other sections can be switched on and off together.

According to a preferred embodiment of the invention, at least one of the lines in at least one of the segments (preferably all lines in all of the segments) may be arranged in such a manner that the line produces—at each point in time while the alternating electric current is flowing through the line—a row of successive magnetic poles of an electromagnetic field, wherein the successive magnetic poles have alternating magnetic polarities. The row of successive magnetic poles extends in the travel direction of the vehicle which is defined by the track or by the path of travel. Alternatively, the at least one line comprises a plurality of sections which extend transversely to the travel direction of the vehicle which is defined by the track or path of travel. In this case, the sections of the same line are arranged in a row along the path of travel (e.g. the track) in such a manner that—at each point in time while an alternating electric current is flowing through the line—the alternating current flows through successive sections in the row alternatingly in opposite directions.

The magnetic poles produced by the lines and/or the sections of the different lines are—at each point in time—in a repeating sequence extending in the travel direction, wherein the repeating sequence corresponds to a sequence of the phases. For example in the case of a three-phase alternating current, having the phases U, V, W, a section carrying phase U is followed by a section carrying phase V which in turn is followed by a section carrying phase W and this sequence of phases U, V, W is repeated several times in the direction of the track, i.e. in the travel direction. An example will be described later with reference to the attached figures.

In the preferred embodiment of the invention which is mentioned above, the at least one line produces—at each point in time while the alternating electric current is flowing through the line—a row of successive magnetic poles of an electromagnetic field, wherein the successive magnetic poles have alternating magnetic polarities. In other words: At a given point in time the alternating current in the line produces—in the direction of travel—a magnetic field having a magnetic field vector which is oriented in a first direction in a first region of the line, followed by a second region of the line where the field vector of the magnetic field is oriented in the opposite direction of the first direction, followed by another region of the line where the magnetic field vector is oriented again in the first direction and so on. However, it is not always the case that the first direction and the direction of the magnetic field vector in the following region of the line are exactly oriented in opposite direction. One reason may be that the line is not arranged exactly in a regular, repeating manner. Another reason may be non-symmetrical influences of other lines of the conductor arrangement. A further reason may be external electromagnetic fields. Also, the vehicle which is travelling on the track will influence the resulting electromagnetic field.

However, the principle of alternating magnetic poles produced by the same line of the conductor arrangement at each point in time has the advantage that the resulting electromagnetic field strength sideways of the conductor arrangement as a very small intensity which decreases rapidly with increasing distance to the conductor arrangement. In other words, the oppositely oriented magnetic fields in the regions of the line are superimposed sideways of the line and compensate each other. Since it is desirable to have very small electromagnetic field strength on both sides of the track, it is preferred that the at least one line of the electric conductor arrangement is located in and/or under the track wherein the sections of the line which extend transversely to travel direction extend in a horizontal plane. In this context, "horizontal" also covers the case that the track may form a bent and is slightly inclined. Correspondingly the respective "horizontal" plane of the line sections may also be inclined slightly. Horizontal is therefore referred to the standard case that the track is extending in a horizontal plane. The same applies to the case that the path of travel or track is leading upwardly onto a hill or downwardly from the hill. Some percentages of inclination of the path are negligible for the compensation of the magnetic fields sideways of the path.

Since the field intensity sideways of the path is very small, energy can be transferred to the vehicle at high power and EMC limit values (e.g. 5 uT for the sideways magnetic field intensity) can be met easily at the same time.

According to a particularly preferred embodiment, the at least one line in the at least one segment of the electric conductor arrangement extends along the path of travel or track in a serpentine manner, i.e. sections of the line which extend in the direction of travel are followed in each case by a section which extends transversely to the travel direction which in turn is followed again by a section which extends in the direction of travel. In case of a plural-phase system preferably all lines of the conductor arrangement are arranged in this manner. The line may be realized by a cable.

The expression "serpentine" covers lines having a curved configuration and/or having straight sections with sharply bent transition zones to neighbouring sections. Straight sections are preferred, since they produce more homogenous fields.

In particular, the alternating current in the at least one line of the at least one segment produces an electromagnetic wave which moves in or opposite to the direction of travel with a velocity proportional to the distance of consecutive magnetic poles of the line and proportional to the frequency of the alternating current. Preferably, at least some of the sections which extend transversely to the travel direction, and preferably all of these sections, extend over a width which is greater than the width of a receiving device of a vehicle on the track for receiving the transferred energy. For example, the width of the sections may be greater than maximum width of the vehicles which may occupy the track.

One advantage of the embodiment is that the alternating current which flows through the sections produces a nearly homogenous intensity of the magnetic field in the region where the receiving device may be located.

A further embodiment of the system or method of the present invention guarantys that the alternating magnetic field intensity is constant over time. To achieve this goal, the lines of the conductor arrangement are connected to an AC (alternating current) constant-current source which is adapted to feed the lines with an alternating current, the mean value of which is constant (or nearly constant) independently of the power which is transferred from the electric conductor arrangement to the vehicle or to the vehicles.

According to a preferred embodiment of the AC constant-current source, it comprises an electrical arrangement which transforms AC voltage to AC current. This electrical arrangement may comprise—in each line—an input inductivity at an input side of the constant-current source and an output inductivity at an output side of the constant-current source, wherein the input side is connected to a voltage source, wherein the output side is connected to line sections along the path of travel, wherein each line comprises a connection point between the input side and the output side and wherein each connection point is connected to a common same star point via a capacity.

If only one vehicle is powered by the primary side power source (which is feeding the conductor arrangement) at a time, a constant AC voltage can be applied to the track side electric conductor arrangement alternatively. Because of the presence of one vehicle only, any interferences of load distribution are avoided. In this case, the AC current through the conductor arrangement (which is caused by the constant AC voltage supply) depends on the load strength. Therefore, the electrical losses of the primary side electric conductor arrangement are load dependent and the current is not constant, as in the case (described above) of a constant AC current supply.

The energy source (or power source) may be (this also applies to other embodiments of the system) a conventional inverter for producing an AC voltage from a constant DC voltage.

Preferably, the electric conductor arrangement is located under the track, e.g. under ground.

The at least one line comprises an inductivity which is used to transfer the electric energy to the vehicle or vehicles and further comprises a leakage inductivity which does not contribute to the energy transfer to the vehicle or vehicles, wherein the leakage inductivity is compensated by a capacity located in the same line so that the resulting impedance of the capacity and the leakage inductivity is zero. Such a zero impedance has the advantage that the reactive power of the system is minimized and, therefore, the design of the active power components is minimized as well.

Principles and details regarding the reception of energy within the vehicle will be described with reference to the attached figures. However, some features are described in the following: The receiving device of the vehicle may comprise a coil of a conductor or of conductors or it may comprise a plurality of coils. The advantage of plural coils of a plural phase receiving device is that it is easier and means less effort to smooth the fluctuations of the received currents or voltages.

Preferably, the at least one coil is positioned only a few centimetres above the primary side conductor arrangement, because the magnetic coupling between primary and secondary coils will decrease with increasing distance. E.g., the at least one coil is positioned not more than 10 cm above the ground, preferably not more than 5 cm and most preferred 2-3 cm above the ground. In particular, this applies if the conductor arrangement is located under the ground. The line or lines of the conductor arrangement may be located not more than 2 cm below the surface of the ground, preferably not more than 1 cm.

Preferably, the receiving device which receives the transferred energy is movable in vertical direction so that it can be brought in a position closely above ground and it can be lifted into a higher position when the receiving device is not used.

Preferably, the receiving device comprises a plurality of coils which are arranged at different positions in the direction of the travel. For example, the distance between the coils may be equal to the distance of the sections of different phases of the conductor arrangement along the track, wherein these sections are sections which extend transversely to the travel direction. However, it is not necessary to place the different coils of the vehicle at the same distance to each other like the distance of the sections.

BRIEF DECRIPTION OF THE DRAWING

Figure 2:
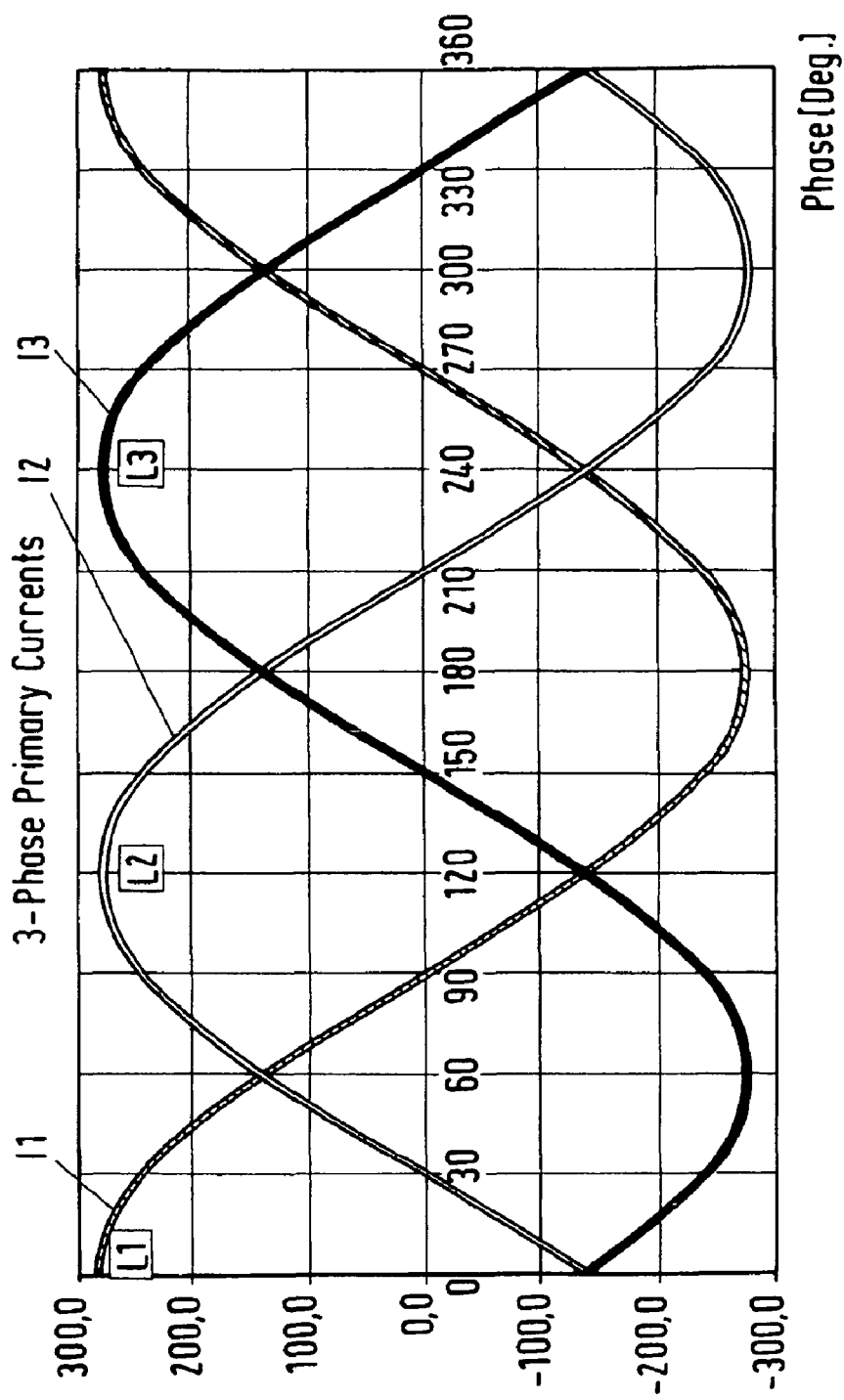
Figure 3:
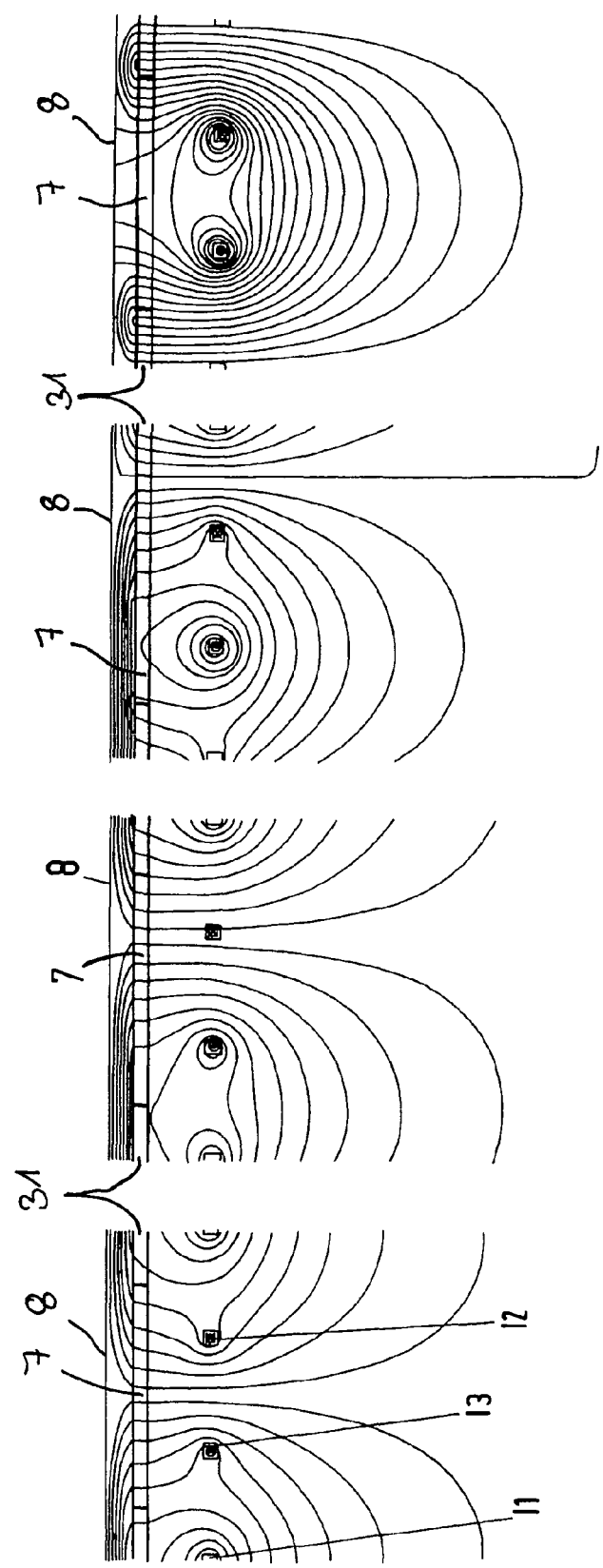
Figure 4:
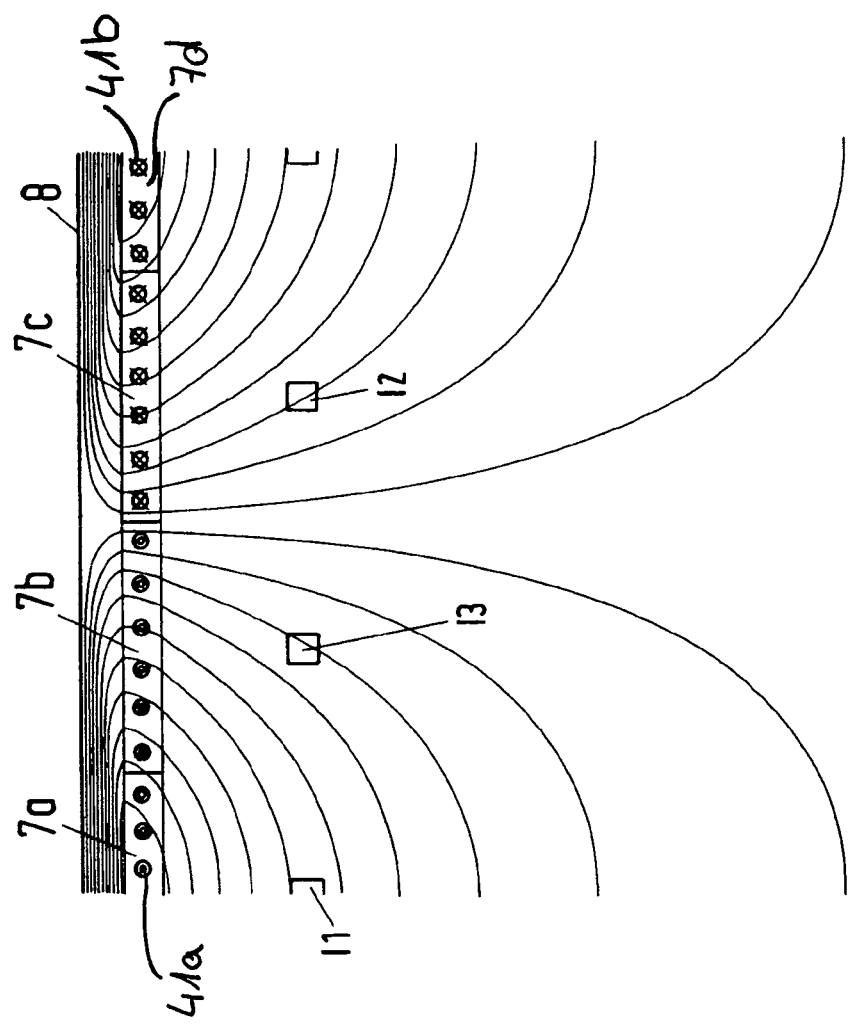
Figure 5:
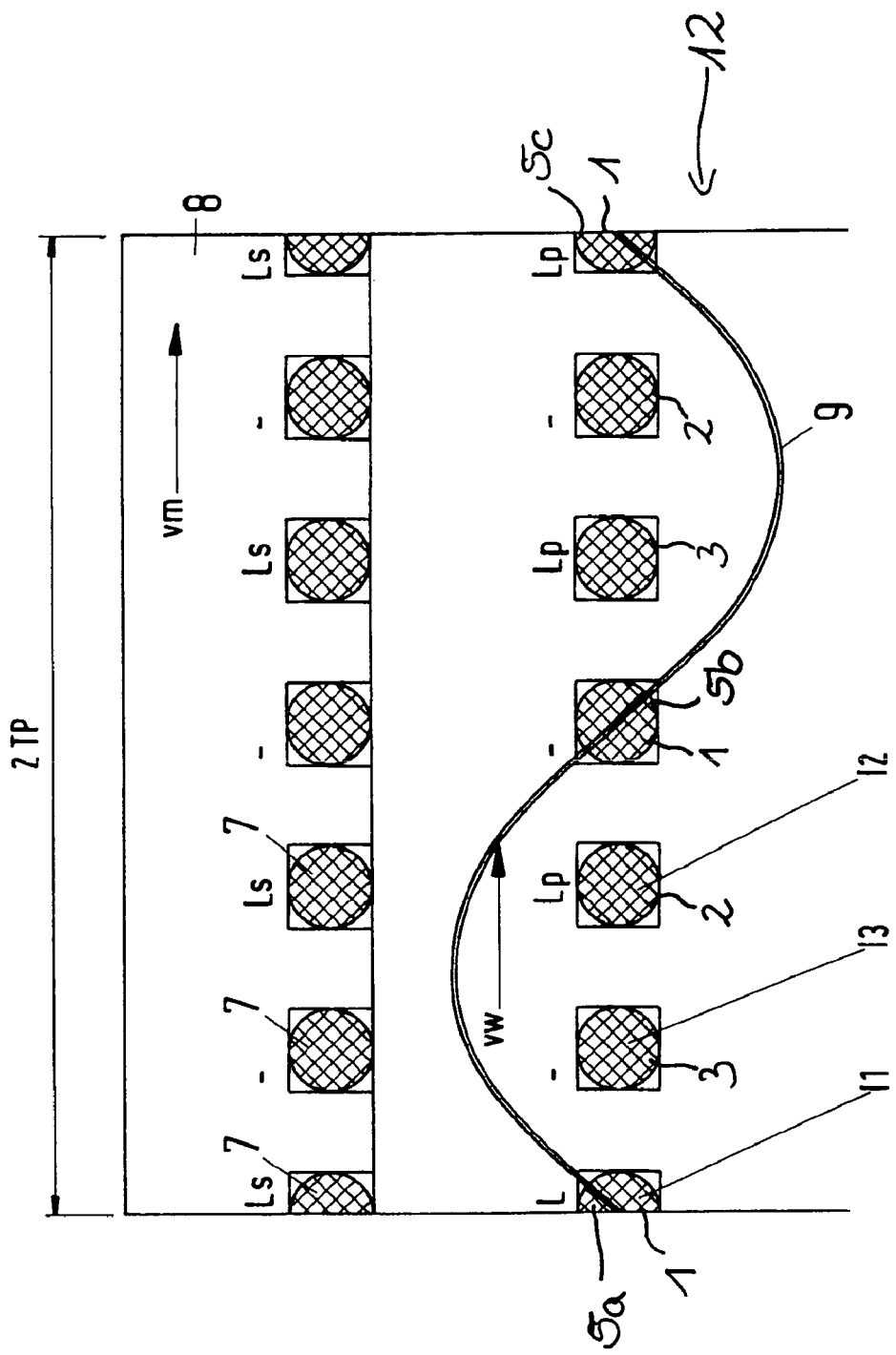
Figure 7:
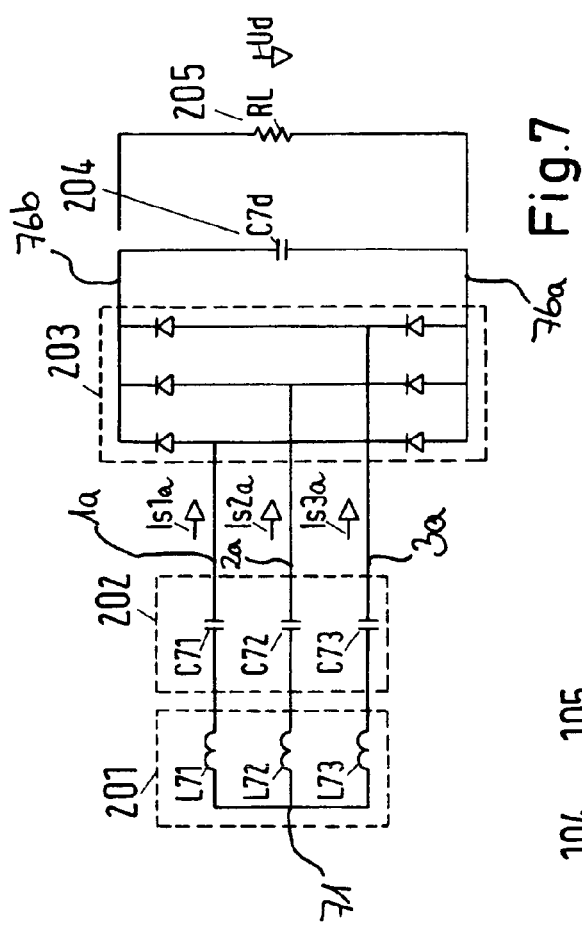
Figure 6:
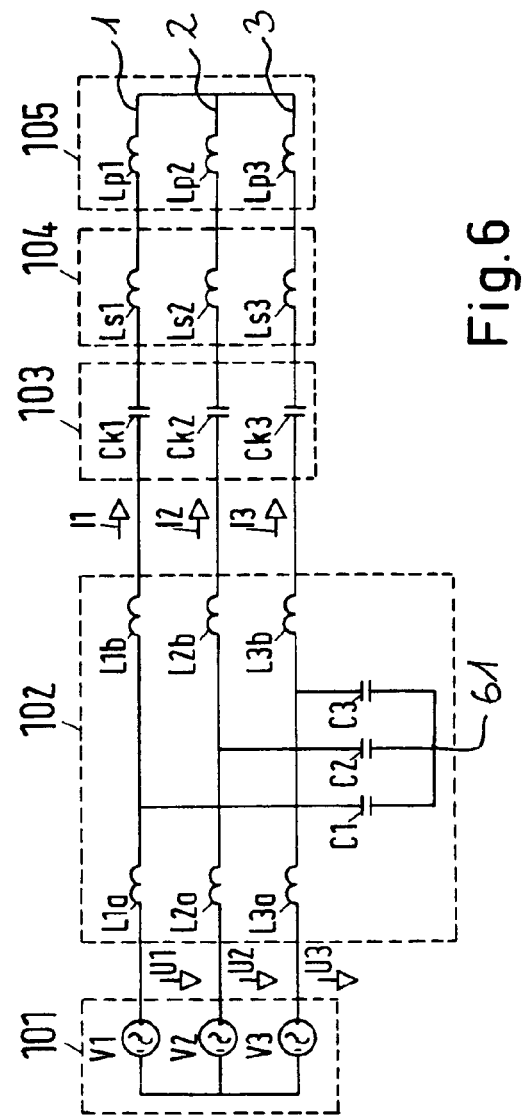
Figure 8:
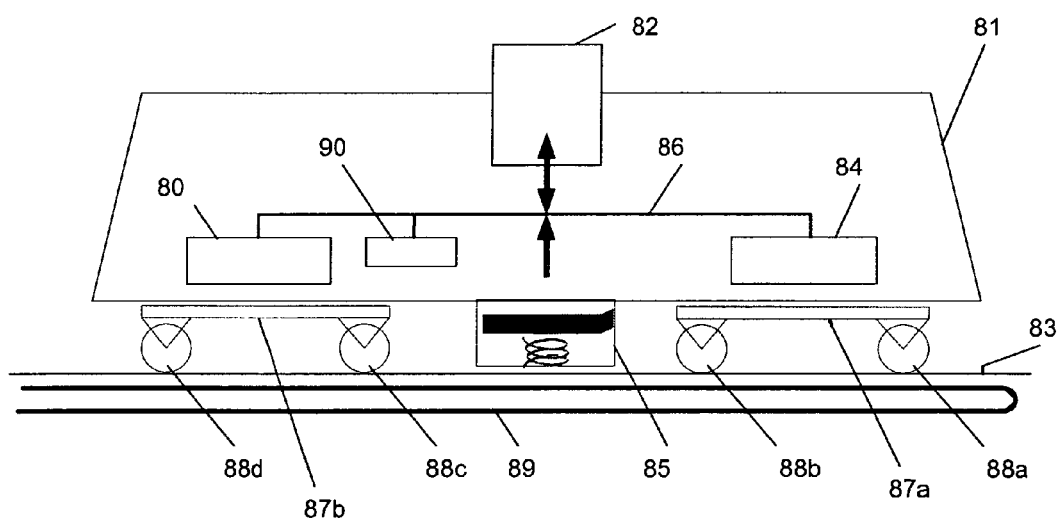
Figure 9A:
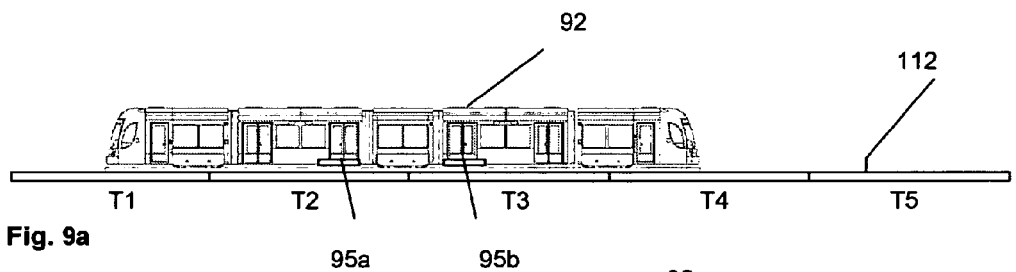
Figure 9B:
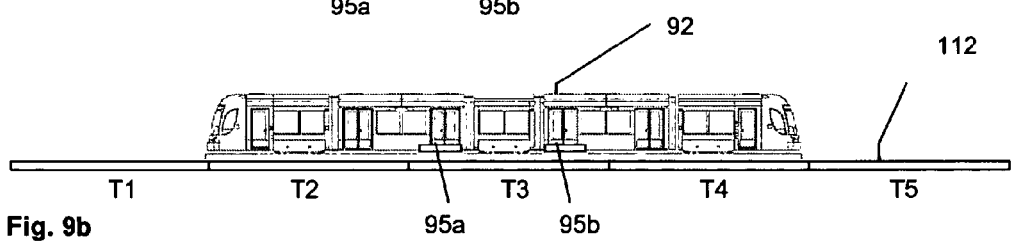
Figure 9C:
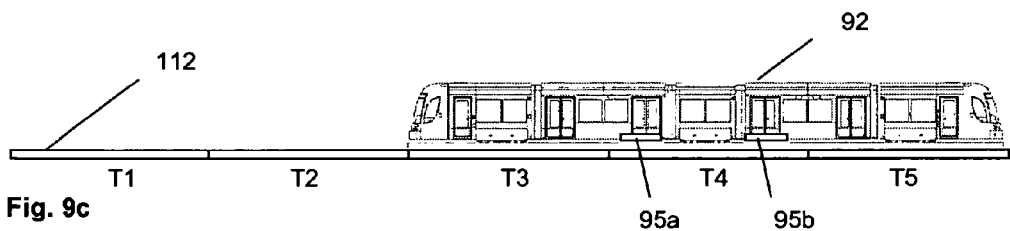
Figure 10:
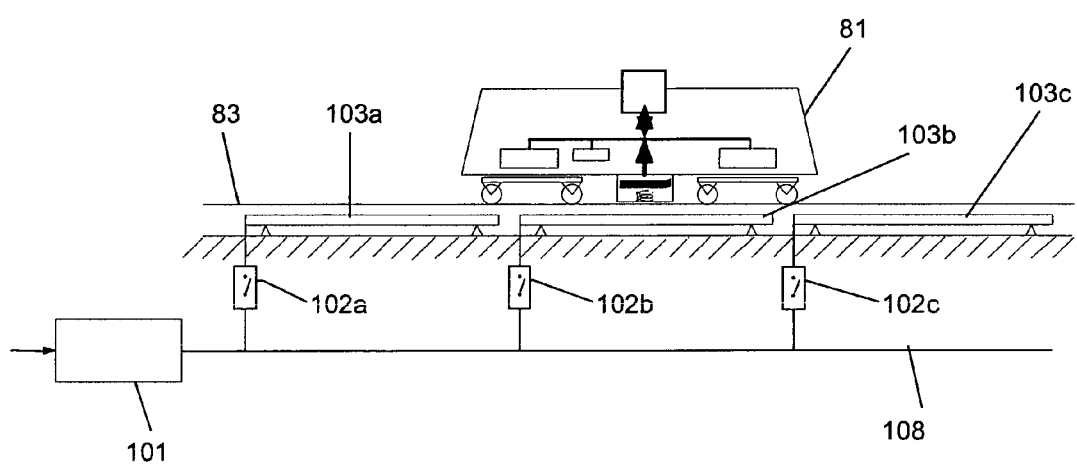
Figure 11:
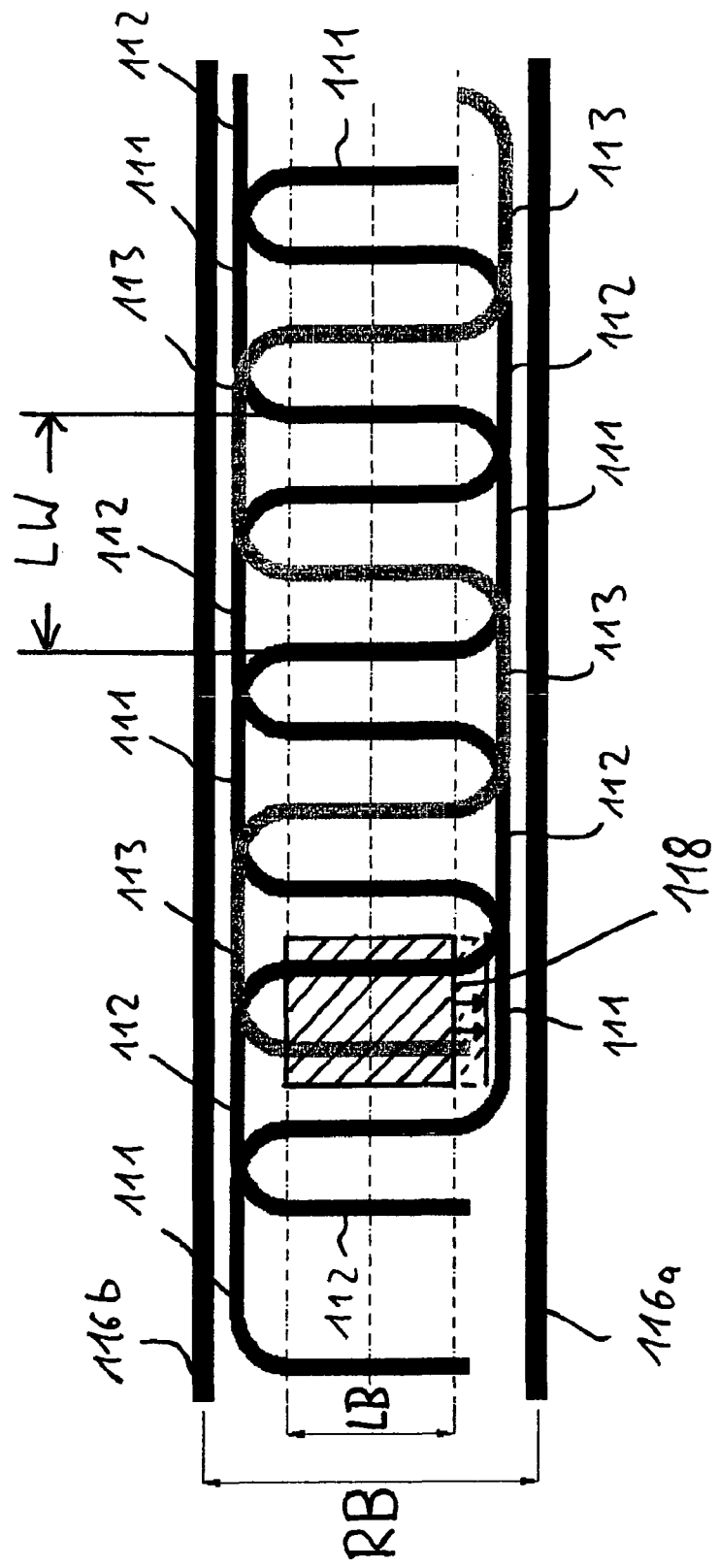
Figure 12:
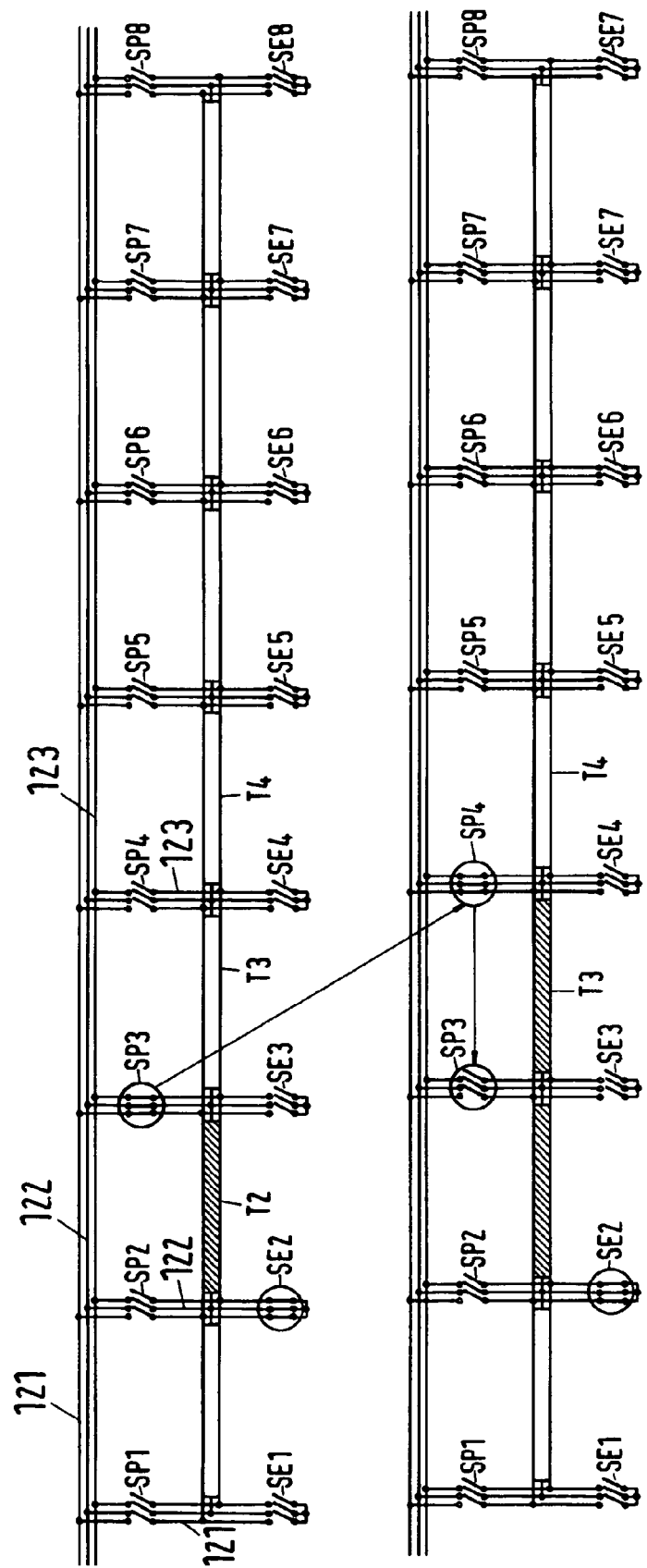
Figure 13:
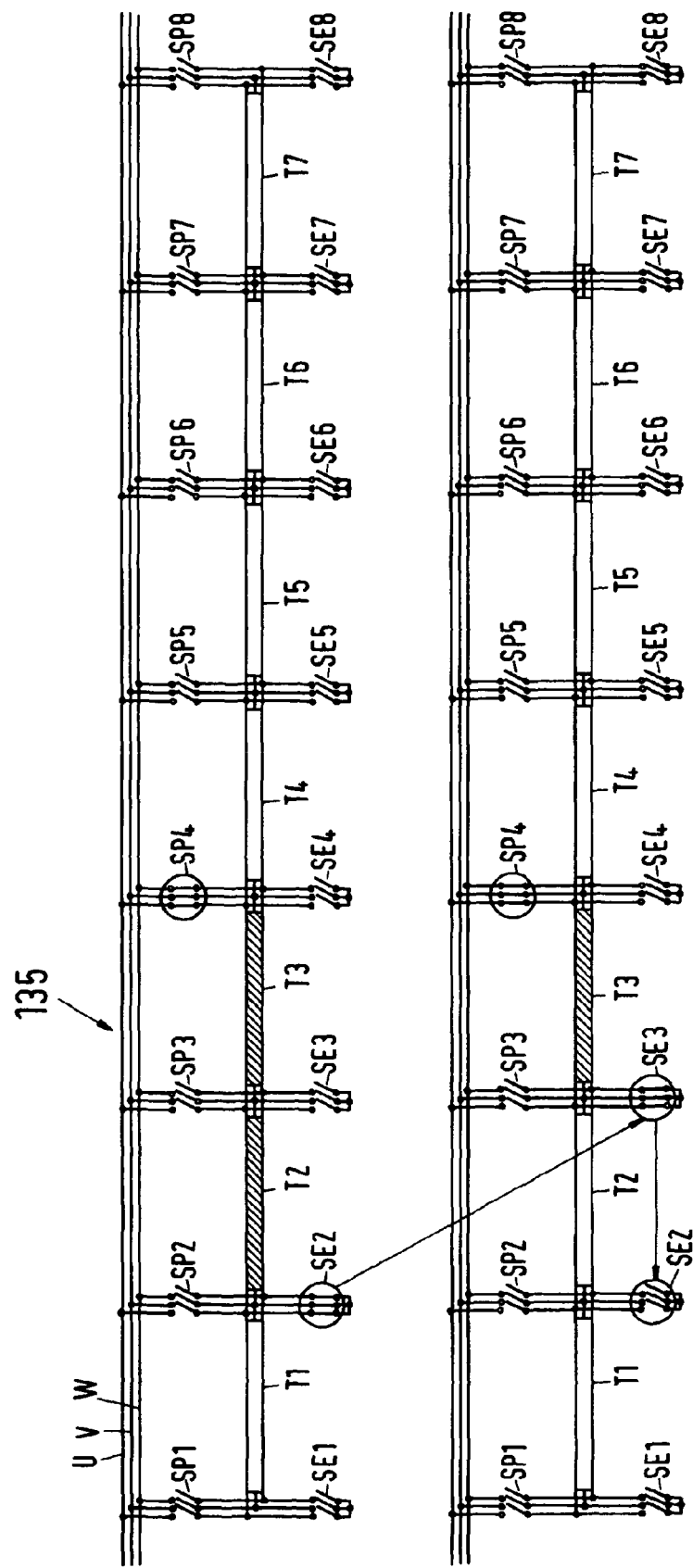
Figure 14:
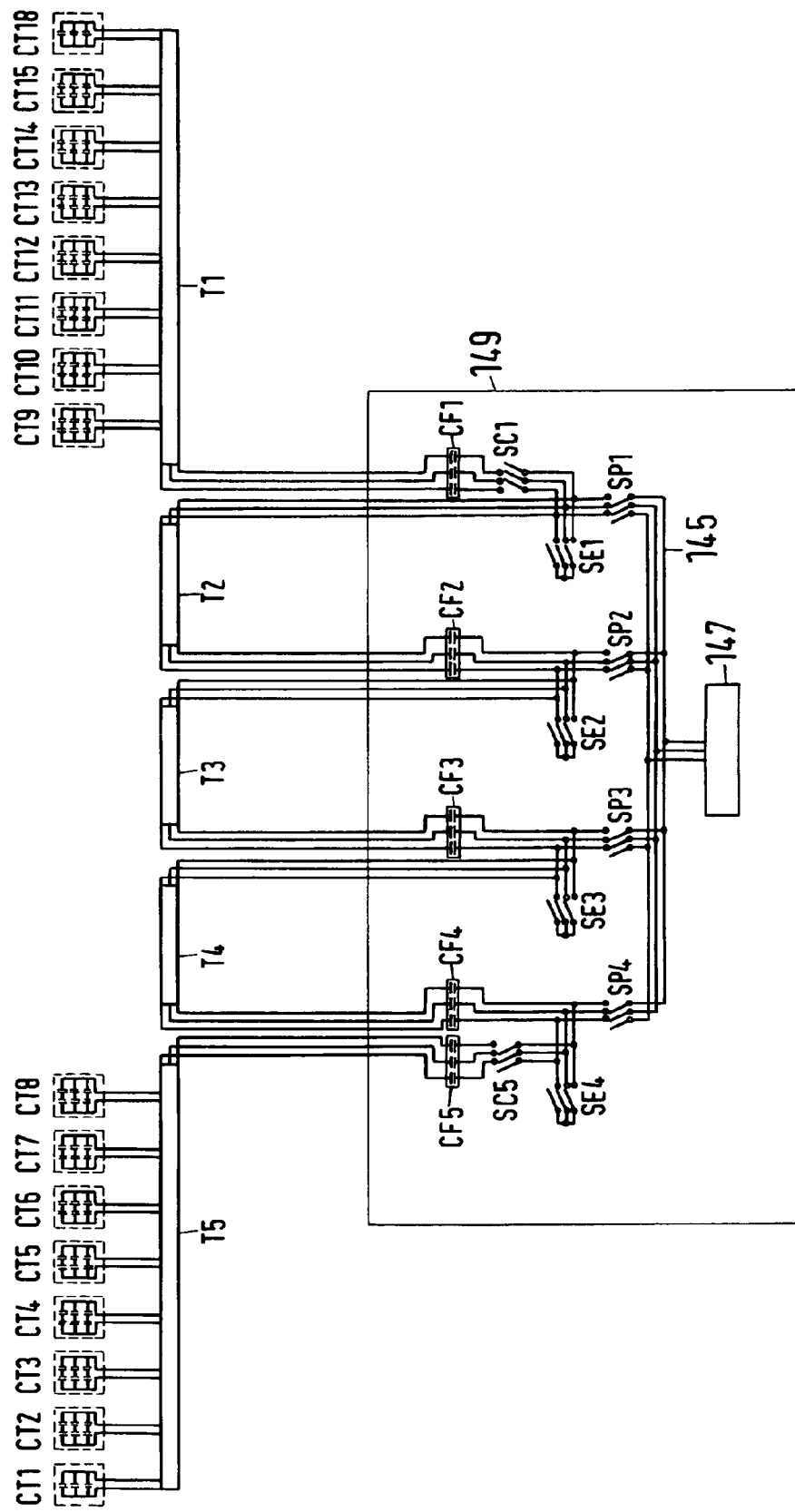
Figure 15C:
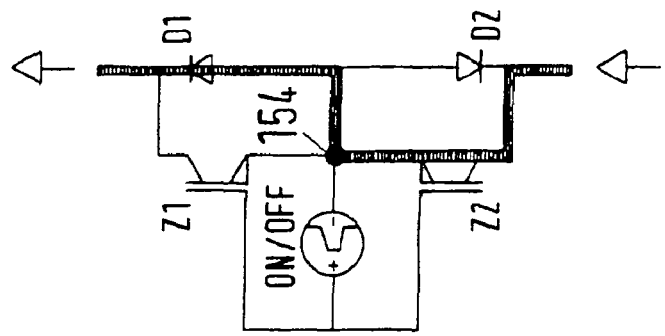
Figure 15B:
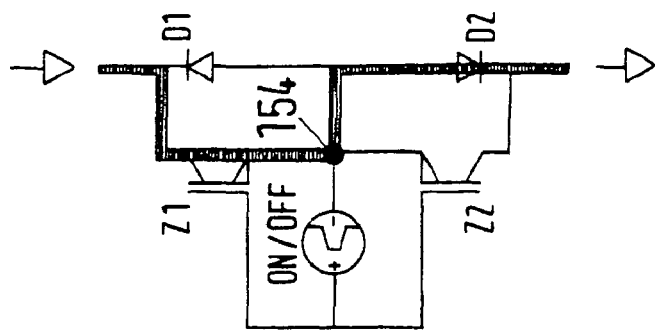
Figure 15A:
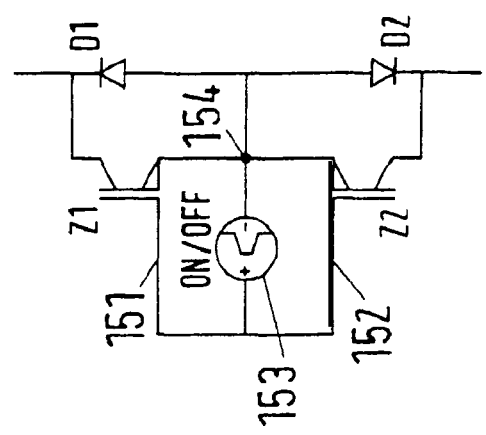

Embodiments and examples of the present invention will now be described with reference to the attached figures. The figures show:

FIG. 1 schematically a three-phase conductor arrangement which extends along a track, FIG. 2 a diagram showing alternating currents through the three-phases of the arrangement according to FIG. 1 as functions of time, FIG. 3 magnetic field lines of a magnetic field, which is produced by the conductor arrangement according to FIG. 1, while a receiving device of a vehicle is located above the shown region of the conductor arrangement, wherein the direction of travel of the magnetic field distribution extends in the plane of the figure from right to left or from left to right, FIG. 4 another diagram showing a region of the magnetic field which is produced by the conductor arrangement, while a load is connected to the receiving device in the vehicle, FIG. 5 a diagram showing schematically the movement of the magnetic wave produced by the conductor arrangement along the track and showing the movement of the receiving device due to the movement of the vehicle on the track, FIG. 6 a schematic circuit diagram of the conductor arrangement according to FIG. 1 which is connected to an AC voltage source via an electrical arrangement which is transforming a voltage of the source into a constant alternating current which is fed into the conductor arrangement, FIG. 7 a circuit diagram showing a receiving device of a vehicle having coils for three different phases, wherein the receiving device is connected to an AC/DC-converter, FIG. 8 a rail vehicle which is travelling on a track along which a conductor arrangement extends, FIG. 9a-c three consecutive points in time of a situation in which a rail vehicle travels on a track, wherein the track is provided with a plurality of consecutive line segments of a conductor arrangement, wherein the line segments can be switched on and off for providing the vehicle with energy, FIG. 10 an arrangement similar to the arrangement shown in FIG. 8 including a circuit diagram of a conductor arrangement along the track, wherein the conductor arrangement comprises line segments which can be switched on and off, and FIG. 11 an arrangement similar to the arrangement shown in FIG. 1, schematically illustrating a conductor arrangement between two rails of a railway, FIG. 12 seven segments which extend along a path of travel of a vehicle, wherein only one of the segments is operated and wherein a second consecutive segment is switched on, FIG. 13 the arrangement shown in FIG. 12, wherein two consecutive segments are operated and one of the segments is switched off, FIG. 14 an arrangement having five segments which can be switched on and off and FIG. 15a-c a semiconductor switch arrangement for switching one phase, for example for switching one phase in a feed line switch of FIG. 12 or 13.

DECRIPTION OF THE PREFERRED EMBODIMENTS

FIG. 1 shows a conductor arrangement which may be located underground along a track, for example along the rails of a railway (see the arrangement shown in FIG. 11, for example). In the latter case, the rails extend from left to right in the view of FIG. 1. The arrangement shown in FIG. 1 may be one segment of a plurality of segments of the total conductor arrangement extending along the path of travel.

FIG. 1 is understood to be a schematic view. The three lines 1, 2, 3 of the conductor arrangement comprise sections which extend transversely to the direction of travel (from left to right or right to left). Only some of the transversely extending sections of lines 1, 2, 3 are denoted by the reference numerals, namely three sections 5a, 5b and 5c of line 3, some further sections of the line 3 by "5", one section 5x of line 2 and one section 5y of line 1. In the most preferred case, the arrangement 12 shown in FIG. 1 is located underground of the track so that FIG. 1 shows a top view onto the arrangement 12. The rails may extend from left to right, at the top and the bottom in FIG. 1, i.e. the transversely extending line sections may be completely within the boundaries defined by the rails (see also FIG. 11).

For example, in the manner as shown in FIG. 6, the three lines 1, 2, 3 may be connected to a three-phase AC current source. Optionally, the current source may be connected to the arrangement shown in FIG. 1 via a feed line which extends along the path of travel of the vehicle and which may feed other segments with the current as well. At the time which is depicted in FIG. 1, a positive current I1 is flowing through line 3. "Positive" means, that the current flows from the current source into the line. The three lines 1, 2, 3 are connected at the other end of the arrangement together at a common star point 4. Consequently, at least one of the other currents, here the current I2 through the line 2 and the current I3 through the line 1, are negative. Generally speaking, the star point rule applies which means that the sum of all currents flowing to and from the star point is zero at each point in time. The directions of the currents through lines 1, 2, 3 are indicated by arrows. When the arrangement shown in FIG. 1 is one of a plurality of segments of the total conductor arrangement, the lines 1, 2, 3 may be connected to the star point 4 via a three-phase switch. In addition, a three-phase switch for connecting the three phases at the end of the star point connection to a feed line may also be provided. The function of such star point switches and feed lines switches will be described below.

The sections of line 3 and the corresponding sections of lines 1, 2 which extend transversely to the direction of travel preferably have the same width and are parallel to each other. In practice, it is preferred there is no shift in width direction between the transversely extending sections of the three lines. Such a shift is shown in FIG. 1 for the reason that each section or each line can be identified.

Preferably, each line follows the same serpentine-like path along the track, wherein the lines are shifted in the direction of travel by one third of the distance between consecutive sections of the same line extending transversely to the direction of travel. For example, as shown in the middle of FIG. 1, the distance between consecutive sections 5 is denoted by T. Within the region between these consecutive sections 5, there are two other sections which extend transversely to the direction of travel namely, section 5x of line 2 and section 5y of line 1. This pattern of consecutive sections 5, 5x, 5y repeats at regular distances between these sections in the direction of travel.

The corresponding direction of the current which flows through the sections is shown in the left region of FIG. 1. For example, section 5a carries a current from a first side A of the arrangement 12 to the opposite side B of the arrangement. Side A is one side of the track (such as the right hand side in the direction of travel, when viewed from a travelling vehicle) and side B is the opposite side (e.g. the left side of the track), if the arrangement 12 is buried in the ground under the track, or more generally speaking, extends in a horizontal plane.

The consecutive section 5b consequently carries an electric current at the same time which is flowing from side B to side A. The next consecutive section 5c of line 3 is consequently carrying a current from side A to side B. All these currents have the same size, since they are carried by the same line at the same time. In other words: the sections which extend transversely are connected to each other by sections which extend in the direction of travel.

As a result of this serpentine like line arrangement the magnetic fields which are produced by sections 5a, 5b, 5c, . . . of the line 3 produce a row of successive magnetic poles of an electromagnetic field, wherein the successive magnetic poles (the poles produced by section 5a, 5b, 5c, . . . ) have alternating magnetic polarities. For example, the polarity of the magnetic pole which is produced by section 5a may correspond at a specific point in time a magnetic dipole, for which the magnetic north pole is facing upwardly and the magnetic south pole is facing downwardly. At the same time, the magnetic polarity of the magnetic field which is produced by section 5b is oriented at the same time in such a manner that the corresponding magnetic dipole is facing with its south pole upwardly and with its north pole downwardly. The corresponding magnetic dipole of section 5c is oriented in the same manner as for section 5a and so on. The same applies to lines 1 and 2.

However, the present invention also covers the case that there is only one phase, that there are two phases or that there are more than three phases. A conductor arrangement having only one phase may be arranged as line 3 in FIG. 1, but instead of the star point 4, the end of the line 3 (which is located at the right hand side of FIG. 1) may be connected to the energy source (not shown in FIG. 1) by a connector line (not shown in FIG. 1) which extends along the track. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

FIG. 11 is intended to illustrate some dimensions of the conductor arrangement, for example the conductor arrangement shown in FIG. 1. Only parts of the three lines 111, 112, 113 are shown in FIG. 11 and connections to each other (e.g. via the star point 4 of FIG. 1) and to the power supply are omitted.

The serpentine like lines 111, 112, 113 are located between two rails 116a, 116b of a railway for railway vehicles (such as regional or local trains, such as a tram). The expression "between" is related to the top view shown in FIG. 11. For example, the lines 111, 112, 113 may be located below the level of the rails 116.

Each of the lines 111, 112, 113 comprises linear sections which extend transversely to the direction of the track, i.e. the longitudinal direction of the rails 116. These transversely extending sections are connected to the consecutive transversely extending sections of the same line via longitudinally extending sections, which extend in the longitudinal direction of the rails. The transversely and linearly extending sections have a length LB, which is preferably at least as large as half the distance RB between the rails. For example, the distance RB may be 1 m and the length of the transversely extending sections may be 50 cm or in the range of 50 to 75 cm.

The transversely extending sections and the longitudinally extending sections of the same line are connected to each other by curved sections. The curvature corresponds, for example, to the curvature of a circle having a radius of 150 mm.

FIG. 11 also schematically shows a shaded area 118 which is covered by a coil of a receiving device of a vehicle travelling on the rails 116. The width of the coil is equal to the lengths of the transversely extending sections of the lines. However, in practice, it is preferred that this width is smaller than the length of the transversely extending sections. This allows for a shift in the position of the coil in the direction transverse to the travel direction, as indicated by two arrows and a line below the shaded area 118. Such a shift would not influence the reception of energy by the coil, if the shift would not move the coil beyond the boundaries of the transversely extending sections.

As follows from the time dependent diagram shown in FIG. 2, the currents through the phases 1, 2, 3 of FIG. 1 are phase currents of a conventional three-phase alternating current.

L1, L2, L3 in FIG. 2 denote that the serpentine like lines 1, 2, 3 form inductivities.

As shown in FIG. 2, the peak current value of the currents may be in the range of 300 A respectively −300 A. However, greater or smaller peak currents are also possible. 300 A peak current is sufficient to provide propulsion energy to a tram for moving the tram along a track of some hundred meters to a few kilometres, for example within the historic town centre of a city. In addition, the tram may withdraw energy from an on-board energy storage, such as a conventional electrochemical battery arrangement and/or a super cap arrangement. The energy storage may be charged again fully, as soon as the tram has left the town centre and is connected to an overhead line.

The bent lines in FIG. 3 are field lines of the magnetic field which is produced by the sections of lines 1, 2, 3 shown in FIG. 1. FIG. 3 depicts the situations at four different points in time which correspond to "0", "30", "60", "90" on the time scale of FIG. 2. The time scale of FIG. 2 can also be interpreted as a scale showing the angle of the sinusoidal behaviour of the currents, which means that FIG. 2 shows the behaviour of the currents over one full period, i.e. the current values at the beginning of the period at "0" are the same as at the end of the period at "360".

In the left of the four partial diagrams of FIG. 3, cross sections of transversely extending sections of lines 1, 2, 3 are shown. Reference sign "I1" denotes the current I1 which is flowing through a transversely extending section of line 1 and so on. These transversely extending sections extend perpendicularly to the image plane of FIG. 3, wherein the image plane is a vertical cut plane through the arrangement 12 of FIG. 1, wherein the image planes of FIG. 1 and FIG. 3 are perpendicular to each other and wherein the image plane of FIG. 3 extends in the direction of travel, cutting the sections 5 of FIG. 1 in two halves. In the upper regions of FIG. 3, electromagnetic coils 7 are schematically shown as flat rectangular framed areas. On top of these coils 7, which are parts of a receiving device of a vehicle for receiving the energy from the arrangement 12, ferromagnetic backbones 8 are located in order to bundle and divert the magnetic field lines. These backbones 8 have the functions of a core of an electromagnet.

FIG. 4 shows a similar view as the views shown in FIG. 3. However, the figure is meant to illustrate the hypothetical situation that coils in the vehicle (which is travelling on the track) induce current in the conductor arrangement of the track. In addition to FIG. 3, FIG. 4 also shows cross sections through electric conductors 41a, 41b in the regions 7a, 7b, 7c, 7d of the coil 7. In region 7a, 7b, a current which is oriented upwardly out of the image plane of FIG. 4 is flowing at the depicted point in time. On the right hand side of FIG. 4, where regions 7c, 7d of coil 7 are shown, the current is directed downwardly into the image plane of FIG. 4, as indicated by crossed lines. The electromagnetic field (illustrated by the field lines in FIG. 4) which is produced by the coil 7, is symmetric to the border line of sections 7b and 7d, since the amounts of the currents in sections 7a to 7d are also symmetric to the border line.

FIG. 5 shows another cut along a cutting plane which extends vertically and which extends in the travel direction. The wires or bundles of wires of lines 1, 3, 2 which are located in sections of the lines 1, 3, 2 which extend transversely to the direction of travel are shown in the upper half of FIG. 5. In total, seven sections of the arrangement 12 which extend transversely to the travel direction are shown in FIG. 5, at least partially. The first, fourth and seventh section in the row (from left to right) belong to line 1. Since the direction of the current I1 through section 5b (the fourth section in FIG. 5) is opposite to the direction of the current I1 through the sections 5a, 5c (the first and the seventh section in FIG. 5), and since the currents I1, I3, I2 are alternating currents, the produced electromagnetic wave is moving in the direction of travel at a speed vw. The wave is denoted by 9, the inductivity of the arrangement 12 by Lp.

The cross sections shown in the upper half of FIG. 5 represent a receiving device of a vehicle which is traveling in the direction of travel and at a speed vm and at the top of FIG. 5 "2 TP" indicates that FIG. 5 shows a line segment of arrangement 12, the length of which is equal to twice the distance between three consecutive transversely extending sections of a line, here line 1.

The arrangement shown in FIG. 6 comprises a conductor arrangement 103, 104, 105, which may be the conductor arrangement 12 according to FIG. 1. In order to show their electric properties, equivalent circuit symbols are used in FIG. 6. The three-phase system 103, 104, 105 carries phase currents I1, I2, I3 in phases 1, 2, 3. The inherent inductivities of the phases 1, 2, 3 are denoted by Lp1, Lp2, Lp3 which produce the electromagnetic field for transferring energy to any vehicle on the track. However, the lines 1, 2, 3 also comprise leakage inductivities Ls1, Ls2, Ls3, as indicated in block 104 in FIG. 6. The impedance of these undesired leakage inductivities is compensated by capacities Ck1, Ck2, Ck3 in the lines 1, 2, 3 as shown in block 103.

The electric energy which is used to produce the electromagnetic fields in lines 1, 2, 3 is generated by a three-phase voltage source 101. The phase sources for the phases are denoted by V1, V2, V3 in block 101. The produced voltages in the lines 1, 2, 3 are denoted by U1, U2, U3. The voltage source is connected to the input of a constant-current source 102. An output of this source 102 is connected to the capacities in block 103. At the output of source 102 the currents I1, I2, I3 are generated. These currents are constant over time, independently of the energy which is transferred from lines 1, 2, 3 to any vehicle on the track. At the input side of constant current source 102, the source 102 comprises in each line 1, 2, 3 an input inductivity L1a, L2a, L3a. At the output side of the source 102, each line 1, 2, 3 comprises an output inductivity L1b, L2b, L3b. In between the input and output inductivities, each line 1, 2, 3 is connected to a common star point 61 via a capacity C1, C2, C3.

FIG. 7 shows a circuit diagram of an arrangement which may be located in a vehicle which is traveling on the track. The arrangement comprises a three-phase receiving device for receiving the electromagnetic field from the track and for producing electric energy there from. The receiving device comprises one coil or an arrangement of coils for each phase 1a, 2a, 3a, wherein the coils are denoted by L71, L72, L73 (block 201). In the embodiment shown, the phases 1a, 2a, 3a are connected together at a common star point 71. Leakage inductivities (not separately shown in FIG. 7) of the phases 1a, 2a, 3a are compensated by capacities C71, C72, C73, as shown in block 202.

The output side of the receiving device 201, 202, where the phase currents Is1a, Is2a, Is3a are shown in FIG. 7 is connected to an AC/DC (alternating current/direct current) converter 203. The DC-side of the converter 203 is connected to lines 76a, 76b of an intermediate circuit. The lines 76a, 76b are connected to each other via a smoothing capacity C7d as indicated by "204". The electric load, which may be provided with energy within the vehicle is denoted by a resistance RL at "205" which may be connected to the lines 76a, 76b of the intermediate circuit. "Ud" indicates that the load RI may cause a voltage drop, wherein Ud is the voltage in the intermediate circuit for example.

FIG. 8 shows a track 83 (here: a railway track having two rails) which is occupied by a track bound vehicle 81, such as a regional public transport train or a tram.

The arrangement shown comprises an electric conductor arrangement for producing an electromagnetic field, thereby transferring energy to the vehicle on the track. The conductor arrangement 89 is shown schematically. For example, the conductor arrangement may be designed as shown in FIG. 1. The conductor arrangement 89 (and this applies to other arrangements, not only to the example shown in FIG. 8) may be located underground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape.

The track bound vehicle 81 comprises at its underside a receiving device 85 for receiving the electromagnetic field which is produced by the conductor arrangement 89. The receiving device 85 is electrically connected to an on-board electric network 86 so that the electric energy, which is induced in the receiving device 85 may be distributed within the vehicle 81. For example, auxiliary devices 90 and propulsion units 80, 84 for driving propulsion motors (not shown) in bogies 780a, 780b having wheels 88a, 88b, 88c, 88d may be connected to the distribution network 86. Furthermore, an energy storage 82, such as an electrochemical energy storage or an arrangement of capacitors, such as super caps, may also be connected to the distribution network. Therefore, the energy storage 82 may be charged by the energy received by the receiving device, in particular during stops of the vehicle 81 on the track. When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

FIG. 9a-c illustrate the concept of a conductor arrangement 112 comprising sections which can be switched on and off so that only sections, which are switched on produce an electromagnetic field in order to transfer energy to the vehicle or vehicles on the track. The examples of FIG. 9 show 5 segments T1, T2, T3, T4, T5 which are arranged in a row of successive segments along the track.

A vehicle 92, such as a tram, is traveling on the track. Under floor of the vehicle 92 two receiving devices 95a, 95b for receiving electromagnetic field produced by the segments are provided. The receiving devices 95a, 95b may be redundant devices, wherein just one of the devices is necessary for operating the vehicle. This increases operation reliability. However, the devices 95a, 95b may also be non-redundant devices which may produce energy at the same time for operating the vehicle. However, it may happen in this case, that at least one of the devices 95 may not produce electric energy. Instead of two receiving devices, the vehicle may comprise more receiving devices.

The following description relates to all these cases and, in addition, to the case that the vehicle has just one receiving device.

According to the examples shown in FIG. 9, the vehicle is moving from the left to the right. In FIG. 9a, the vehicle 92 occupies the track above elements T2, T3 and partly occupies the track above elements T1 and T4. The receiving devices 95 or the receiving device are located always above elements which are fully occupied by the vehicle. This is the case, because the distance between the receiving devices to the nearest end of the vehicle in lengthwise direction is greater than the length of each segment of the conductor arrangement 112.

In the situation of FIG. 9a, the elements T2, T3 are switched on and all other elements T1, T4, T5 are switched off. In FIG. 9b, where the vehicle 92 fully occupies the track above elements T2, T3 and nearly fully occupies the track above element T4, element T2 has been switched off, because the receiving devices 95 or the receiving devices have/has already left the region above element T2, and element T4 will be switched on as soon as the vehicle fully occupies the region above the element T4. This state, when the element T4 is switched on is shown in FIG. 9c. However, in the meantime element T3 has been switched off.

FIG. 10 shows an arrangement which is similar to the arrangements shown in FIG. 9. In fact, it may be a different view of the same arrangement as shown in FIG. 9. However, FIG. 10 shows additional parts of the arrangement. Each of the successive segments 103a, 103b, 103c of the conductor arrangement for producing an electromagnetic field is connected via a separate switch 102a, 102b, 102c for switching on and off the element 103, to a mainline 108. In the case of a three-phase alternating current system, the mainline 108 may comprise wires or cables for each phase. The far end of the mainline 108 (at the right hand side of FIG. 10, but not shown) may comprise a common star point of all three-phases. On the opposite site of the mainline 108, it is connected to an energy source 101, such as the arrangement according to blocks 101, 102 as shown in FIG. 6.

Each of FIGS. 12 and 13 shows a conductor arrangement having seven segments which can be switched on and off separately, wherein each figure shows two different switching states of the conductor arrangement.

The arrangements shown in FIGS. 12 and 13 are examples and are intended to illustrate a preferred embodiment of the invention. However, the number of segments, which are part of the conductor arrangement can be varied in practice. In particular, there might be more segments than seven, in particular if the length of the segments in the direction of travel of the vehicle (not shown in FIGS. 12 and 13) is shorter than the length of the vehicle.

In FIGS. 12 and 13 the segments are schematically shown and are denoted by reference signs T1-T7. The arrangements shown in FIG. 9, may be part of the arrangement shown in FIGS. 12 or 13. In particular, the conductor lines for carrying the phases of the alternating current may be arranged in the way described above, for example as shown in FIG. 1, which may be the illustration of a single segment, wherein the star point switch SE of the segment is omitted.

The arrangement shown in FIGS. 12 and 13 comprise a three-phase feed line, which is shown above the consecutive line of segments T1-T7. At each interface between two consecutive segments T1-T7, there is a three-phase switch SP2-SP7. These switches SP2-SP7 connect the three phases of the feed line 135 with the interface between the two consecutive segments, provided that the switch SP2-SP7 is closed. If the switch SP2-SP7 is not closed, i.e. is open, the respective interface is electrically insulated against the feed line.

At the respective interface, there is a electric connection between the corresponding lines of the consecutive segment (i.e. between the lines of both segments for carrying phase U, for carrying phase V and for carrying phase W) and, in addition, a three-phase connection to the respective switch SP2-SP7. However, according to alternative embodiments, further switches for disconnecting the lines of at least one of the consecutive segments from the interface can be used.

Furthermore, each interface between two consecutive segments T1-T7 is also connected to a switch SE2-SE7. In the open state of the switch SE2-SE7, there is no connection between the three phases U, V, W at the interface. However, in the closed state of the switch SE2-SE7, the three phases U, V, W are shorted, i.e. a star point connection is realized.

In FIG. 12 and in the upper half of FIG. 13, the star point switch SE2 is closed and all other star point switches SE1 and SE3-SE8 are open. In the lower half of FIG. 13, only star point switch SE3 is closed and all other star point switches SE1, SE2 and SE4-SE8 are open.

In the embodiment shown in FIGS. 12 and 13, there are also feed line connector switches SP8 and SP1 at the beginning of segment 17 and at the end of the segment T1, respectively. Furthermore, there are star point switches SE8 and SE1 for realizing a star point connection at the beginning of segment 17 and at the end of segment T1, respectively.

The operation of the arrangement shown in FIGS. 12 and 13 is as follows, for example: Starting with the situation illustrated in the upper half of FIG. 12, only segment T2 is operated. For example, a vehicle might occupy the section of the path of travel which extends along segment T2, i.e. the receiving device of the vehicle or the receiving devices of the vehicle may be in the section of segment T2. In particular, segment T2 may be arranged below the track of a rail vehicle and the receiving device(s) may be above segment T2.

In order to realize the operation of segment T2 as the only segment which is switched on, feed line switch SP3 is closed and star point switch SE2 is closed. All other feed line switches SP and all other star point switches SE are open. Consequently, the front end of segment T2 ("front end" is understood to be located on the right hand side of FIGS. 12 and 13) is connected to the feed line 135. Because the back ends of the three lines of segment T2 are shorted by closed star point switch SE2, the three lines in segment T2 are carrying the three phases of an alternating current and the desired electromagnetic field is generated in order to provide the vehicle with electric energy. Although the back ends of the lines of segment T3 are also connected to the feed line 135 via feed line switch SP3, the lines of segment T3 are not carrying an alternating current, since the front ends of the lines of segment T3 are neither connected to a common star point nor connected to the feed line.

The vehicle is travelling from the left hand side of FIG. 12 to the right hand side of FIG. 12. Consequently, the receiving device(s) of the vehicle will enter the section of the path of travel along segment T3. Preferably, before the receiving device actually enters segment T3, this segment is switched on so that it will be operated at the same time as segment T2, i.e. segments T2 and T3 are consecutive segments which are operated at the same time.

In order to switch on segment T3, first the feed line switch SP4 is closed. As a result, the series connection of the corresponding lines of segment T2 and T3 is connected to the feed line 135 via feed line switch SP4 and, at the other side of the series connection, it is still connected to a common star point via star point switch SE2. Therefore, a three-phase alternating current is carried by the lines of segments T2 and T3.

In a following step, feed line switch SP3 at the interface between the two consecutive segments T2, T3 is opened, as shown in the lower half of FIG. 12.

Next, as an option, segment T4 may be switched on in the same manner as segment T3, so that the three consecutive sections T2, T3, T4 are operated at the same time. However, alternatively, segment T2 may be switched off (as will be described with reference to FIG. 13) before segment T4 is switched on. In any case, there is always at least one segment switched on and operated where the receiving device(s) of the vehicle is located while the vehicle is traveling on the path of travel.

The description above may not only apply to a three phase system. Rather, any conductor arrangement having consecutive segments, the lines of which can be connected in series to each other, can be operated by first closing the feed line switch and then opening the other feed line switch at the interface as described above. For example, the other conductor arrangement may have only two phases (and therefore only two lines in each segment) or more than three phases with a corresponding number of lines in each segment. Such an alternative conductor arrangement may also be operated in the manner described below in connection with FIG. 13.

In order to switch off segment T2, when segments T2 and T3 are operated at the same time, star point switch SE3 is closed first. As a result, the phases at the interface between the consecutive segments T2, T3, which are operated at the same time, are shorted and, therefore, the current through the segment T2 stops flowing. In a following step, star point switch SE2 can be opened.

The description in connection with FIGS. 12 and 13 is just an example. As mentioned above, the conductor arrangement may be modified regarding the number of phases and/or regarding the realisation of the feed line switches and the star point switches. For example, there may be additional switches at the interfaces between consecutive segments in order to open or close the connection between the corresponding lines in the consecutive segments.

However, according to the preferred embodiment which was described above, there is a connection at the front end of the segment which is operated or at the front end of the consecutive segments which are operated at a time. The "front end" means the side of the segment or segments which is located in the driving direction of the vehicle. Therefore, the vehicle is driving from left to right in the example given in FIGS. 12 and 13. If the vehicle would drive from the right to the left, feed line switch SP2 and star point switch SE4 would be closed and all other switches would be open when segments T2 and T3 are operated. In this case, the front end would be left.

As mentioned, it is preferred that the feed line switch, which is closed, is located at the front end of the segment or segments which is/are operated. Therefore, the star point switch, which is also closed, is located at the back end of the segment or segments which is/are operated.

It should been noted that more than one vehicle may travel on the path of travel at the same time. For example, in order to provide a further vehicle with energy, segments T6 and T7 may be operated at the same time as segment T2 in the situation shown in the upper half of FIG. 12. Consequently, star point switch SE6 and feed line switch SP8 would be switched on. The vehicles would drive in the same direction.

FIG. 14 shows an arrangement with five consecutive segments of a conductor arrangement. Segments T1 and T5 are located at the opposite ends of the conductor arrangement. Segments T2, T3, T4 are segments having a length smaller than the length of a vehicle which may travel on the corresponding path of travel.

A feed line 145 is connected to a power supply 147 (such as the constant alternating current source shown in FIG. 6). The feed line 145 extends along segments T2, T3, T4, but not along segments T1 and T5. In practice, segments T1 and T5 may also be shorter than the length of a vehicle which is to be supplied with energy. Furthermore, there may be more segments extending in parallel to the feed line.

At each interface between segments T2, T3 and T4, the lines of these segments are connected in series to each other. However, at the interfaces between segments T1, T2 and T4, T5, there is a switch SC1, SC5 which disconnects the corresponding lines of the consecutive segments, if the switch is open.

Similarly to the arrangements shown in FIGS. 12 and 13, there are star point switches SE1-SE4 at each interface between consecutive segments. Furthermore, also similarly to FIGS. 12 and 13 there is a feed line switch SEP1-SP4 at each interface.

In order to compensate the leakage inductivity of the segments, capacities CF1-CF5 are arranged at the interfaces between consecutive segments. More precisely speaking, there is at least one capacitor in each line so that at least three capacitors form the capacities CF1-CF5. In addition, there are more capacities CT1-CT8 and CT9-CT18, which are arranged along the longer segments T1 and T5 to compensate for their leakage inductivities. All switches SP1-SP4, SE1-SE4 and SC1, SC5, the feed line 145, the capacities CF1-CF5 and/or the power supply 147 may be located within the same unit 149, such as a container. However, in practice, the feed line may extend along the path of travel and may be buried in the ground below the path of travel. It is preferred that the feed line is shielded so that electromagnetic fields produced by the phases of the feed line are prevented from penetrating into the environment, or, are significantly reduced regarding their field intensity.

As mentioned above, it is preferred that all consecutive segments which are operated at the same time are connected in series to each other and not in parallel to each other. The arrangement shown in FIG. 14 is an embodiment of the preferred version of the invention, namely using star point connections at the interfaces between consecutive segments. The ends of segments T1 and T5 (at the right hand side of segment T1 and at the left hand side of segment T5) are also star point connected, i.e. the three lines of segments T1 and T5 are shorted at the end. Consequently, in order to avoid situations where segments which are operated at the same time are electrically parallel to each other, switches SC1 and SC5 are provided and are open if necessary.

FIG. 15a shows an arrangement of switches Z1, Z2 for switching a single phase. The switches Z1, Z2 are semiconductor switches, preferably IGBTs (Insulated Gate Bipolar Transistors), but may be also other semiconductors switches, such as GTOs (Gate Turn-Off Transistors).

The control electrodes 151, 152 of the switches Z1, Z2 are connected to a control device 153. The control of the switches may be performed in any manner known in the art. Further elements and connections for performing the control are not shown in FIG. 15a-c.

In FIGS. 15b and 15c, two different operating states of the switch arrangement are illustrated. In FIG. 15b, an electric current is flowing from the top through switch Z1 to the connection point 154 between switches Z1, Z2 and, from there, through the free-wheeling diode D2 which is connected in parallel to switch Z2.

According to the illustration of FIG. 15c, the current flows in the opposite direction through the arrangement of switches, through the switch Z2, then to the connection point 154 and then through the free-wheeling diode D1 which is connected in parallel to switch Z1.

In order to realize a star point switch (such as switches SE1-SE8 in FIGS. 12 and 13), only one semiconductor switch is required for each phase. For example based on the arrangement shown in FIG. 15, the lower half of the arrangement can be omitted, i.e. there is only switch Z1 and the corresponding free-wheeling diode D1 for each phase. The three phases are connected to each other at the connection point 154. Other configurations of switches, such as traditional mechanic switches, are also possible.

The invention claimed is:

1. A system for transferring electric energy to a vehicle comprising:
   an electric conductor arrangement for producing an alternating electromagnetic field and for thereby transferring the energy to the vehicle, wherein
   the electric conductor arrangement comprises at least two lines, wherein each line is adapted to carry a different one of phases of an alternating electric current,
   the conductor arrangement comprises a plurality of segments, wherein each segment extends along a different section of the path of travel of the vehicle, each segment comprises sections of the at least two lines and each segment can be switched on and off separately of the other segments, the conductor arrangement is arranged in such a manner that at least two consecutive segments can be operated at a time, wherein corresponding lines for carrying the same phase of the alternating current in the consecutive sections are connected in series to each other, and a switch or an arrangement of switches located at an interface between two consecutive segments of the conductor arrangement, wherein the switch or the arrangement of switches is operated in such a manner that, if only one of the two consecutive segments is operated at the same time, the lines of the segment which is operated are connected to a common star point or to a power supply system, and that, if both consecutive segments are operated at the same time, the corresponding lines of the consecutive segments are connected in series to each other.

2. The system of claim 1, wherein the segments are shorter than the length of a vehicle in the travel direction and wherein the system is adapted to operate segments only if a vehicle is occupying a respective section of the path of travel where the segment is located.

3. The system of claim 2, wherein the system is adapted to switch on the segments only if a vehicle is fully occupying a respective section of the path of travel.

4. A method for transferring electric energy to a vehicle comprising:

producing an electromagnetic field by an electric conductor arrangement located along the track thereby transferring the electric energy to the vehicle, wherein the electromagnetic field is produced by conducting at least a first phase of an alternating current in a first line of the electric conductor arrangement and by conducting at least a second phase of the alternating current in a second line of the electric conductor arrangement, the electric conductor arrangement segments of the conductor arrangement are switched on and off separately of other segments in order to generate the electromagnetic field in a restricted region of the path of travel of the vehicle, wherein each segment extends along a different section of the path of travel of the vehicle and wherein each segment comprises sections of the at least two lines, and if only one of the two consecutive segments is operated at a time, the lines of the segment which is operated are connected to a common star point or to a power supply system, and wherein, if the two consecutive segments are operated at the same time, corresponding lines for carrying the same phase of the alternating current in the consecutive segments are connected in series to each other.

5. The method of claim 4, wherein the lengths of the segments along the path of travel are shorter than the length of a vehicle in the travel direction and wherein segments are switched on only if a vehicle is already occupying the respective section of the path of travel along which segment extends.

6. The method of claim 5, wherein the segments are switched on only if a vehicle is fully occupying the respective section of the path of travel.

7. The method of claim 5, wherein the occupation of a respective section by a vehicle is detected by detecting a voltage and/or a current in the segment or in a separate loop, which voltage and/or a current is caused by inductive coupling of the vehicle to the line segment and/or which is caused by electromagnetic fields produced by the vehicle.

8. The method of claim 5, wherein a segment is switched on before a receiving device of a vehicle for receiving the transferred energy enters the section of the path of travel along which the segment extends.

* * * * *

UNITED STATES PATENT AND TRADEMARK OFFICE
CERTIFICATE OF CORRECTION

PATENT NO. : 8,360,216 B2  Page 1 of 1
APPLICATION NO. : 13/002066
DATED : January 29, 2013
INVENTOR(S) : Meins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 93 days.

Signed and Sealed this
First Day of September, 2015

Michelle K. Lee
*Director of the United States Patent and Trademark Office*